United States Patent
Naganuma et al.

(10) Patent No.: US 8,572,346 B2
(45) Date of Patent: Oct. 29, 2013

(54) STORAGE SYSTEM AND METHOD FOR EFFICIENTLY UTILIZING STORAGE CAPACITY WITHIN A STORAGE SYSTEM

(75) Inventors: Yuki Naganuma, Yokohama (JP); Hirokazu Ikeda, Yamato (JP); Nobuhiro Maki, Yokohama (JP); Masayasu Asano, Yokohama (JP); Shinichiro Kanno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 924 days.

(21) Appl. No.: 12/310,728

(22) PCT Filed: Feb. 20, 2009

(86) PCT No.: PCT/JP2009/000736
§ 371 (c)(1),
(2), (4) Date: Mar. 5, 2009

(87) PCT Pub. No.: WO2010/095176
PCT Pub. Date: Aug. 26, 2010

(65) Prior Publication Data
US 2011/0208940 A1 Aug. 25, 2011

(51) Int. Cl.
*G06F 12/00* (2006.01)
(52) U.S. Cl.
USPC .................. 711/170; 711/114; 711/E12.002
(58) Field of Classification Search
USPC .......................................... 711/170, E12.002
See application file for complete search history.

(56) References Cited

U.S. PATENT DOCUMENTS

| 7,117,336 | B2 * | 10/2006 | Mimatsu et al. ............ 711/202 |
| 7,139,888 | B2 | 11/2006 | Umemura |
| 7,472,239 | B2 | 12/2008 | Horiuchi et al. |
| 2004/0064610 | A1 | 4/2004 | Fukuzawa et al. |
| 2005/0091455 | A1 | 4/2005 | Kano et al. |
| 2007/0050575 | A1 | 3/2007 | Uratani et al. |
| 2007/0055704 | A1 | 3/2007 | Watanabe et al. |
| 2007/0233992 | A1 | 10/2007 | Sato |
| 2008/0034005 | A1 | 2/2008 | Satoyama et al. |
| 2008/0177947 | A1 | 7/2008 | Eguchi et al. |
| 2009/0043942 | A1 | 2/2009 | Shiga |

FOREIGN PATENT DOCUMENTS

| JP | 10-283272 | | 4/1997 |
| JP | 2003-015915 | | 7/2001 |
| JP | 2007-133822 | | 5/2007 |
| JP | 2007-257246 | A | 10/2007 |
| JP | 2007-257667 | A | 10/2007 |
| JP | 2007-265001 | A | 10/2007 |
| JP | 2008-040571 | A | 2/2008 |
| JP | 2008-176627 | A | 7/2008 |

\* cited by examiner

*Primary Examiner* — Larry MacKall
(74) *Attorney, Agent, or Firm* — Stites & Harbison PLLC; Juan Carlos A. Marquez, Esq.

(57) ABSTRACT

In a storage system 1, a storage apparatus A having a first pool 1430 including segments as unit storage areas and a storage apparatus B having a second pool 1430 having the same configuration are communicably connected to each other. In the storage system, an external volume identifier is associated with a logical volume 1420 included in the first pool 1430, the external volume identifier being used by a controller 1500 in the storage apparatus B to identify and manage the logical volume 1420 as an external volume 1425 that is a virtual volume in the storage apparatus B. Moreover, a volume identifier 5110 of the logical volume 1420 included in the first pool 1430 is rewritten into the external volume identifier in order to enable the storage apparatus B to utilize the logical volume 1420 created from the first pool 1430.

15 Claims, 30 Drawing Sheets

Fig. 8

LU MAP TABLE A  5000

| PORTID | STORAGE WWN | CONNECTION host WWN | LUN | DEV ID |
|---|---|---|---|---|
| PORT1 | WWN1 | h1 | 1 | VVol1 |
|  |  |  | 2 | LDEV10 |
|  |  |  | ... | ... |
| PORT2 | WWN2 | ... | 1 | LDEV20 |
|  |  |  | ... | ... |
| ... | ... | ... | ... | ... |

POOL VOLUME MANAGEMENT TABLE 5100 (STORAGE A)

| DEV ID | PoolID | DISK TYPE | RAID LEVEL | RAID GROUP ID | ASSIGNMENT PROHIBITION VVol ID | Vol STATUS |
|---|---|---|---|---|---|---|
| LDEV1 | Pool1 | SATA | RAID1 | RG1-1 | NONE | NORMAL |
| LDEV2 | Pool1 | SATA | RAID1 | RG2-1 | NONE | NORMAL |
| ... | Pool1 | ... | ... | ... | ... | ... |
| LDEV3 | Pool2 | FC | RAID5 | RG2-1 | NONE | NORMAL |
| LDEV4 | Pool2 | FC | RAID5 | RG2-1 | NONE | NORMAL |
| ... | Pool2 | ... | ... | ... | ... | ... |
| ... | ... | ... | ... | ... | ... | ... |

POOL VOLUME MANAGEMENT TABLE 5100 (STORAGE B)

| DEV ID | PoolID | DISK TYPE | RAID LEVEL | RAID GROUP ID | ASSIGNMENT PROHIBITION VVol ID | Vol STATUS |
|---|---|---|---|---|---|---|
| LDEV5 | Pool1 | FC | RAID5 | RG1-1 | NONE | NORMAL |
| LDEV6 | Pool1 | FC | RAID5 | RG2-1 | NONE | NORMAL |
| ... | Pool1 | ... | ... | ... | ... | ... |
| ... | ... | ... | ... | ... | ... | ... |

Fig. 11

SEGMENT MANAGEMENT TABLE 5300 (STORAGE A)

| Pool ID | SEGMENT ID | DEV ID | START LBA | SEGMENT SIZE | VVolID |
|---|---|---|---|---|---|
| Pool1 | 001 | LDEV1 | 0 | 2048 | VVol1 |
| | 002 | LDEV1 | 2048 | 2048 | NULL |
| | ... | ... | ... | ... | ... |
| | 101 | LDEV2 | 1073741824 | 2048 | VVol1 |
| | 102 | LDEV2 | 1073743872 | 2048 | NULL |
| | ... | ... | ... | ... | ... |
| Pool2 | 001 | LDEV3 | 0 | 2048 | NULL |
| | ... | ... | ... | ... | ... |
| | 101 | LDEV4 | 1073741824 | 2048 | VVol2 |
| | ... | ... | ... | ... | ... |
| ... | ... | ... | ... | ... | ... |

Fig. 12

SEGMENT MANAGEMENT TABLE 5300 (STORAGE B)

| Pool ID (5310) | SEGMENT ID (5320) | DEV ID (5330) | START LBA (5340) | SEGMENT SIZE (5350) | VVolID (5360) |
|---|---|---|---|---|---|
| Pool1 | 001 | LDEV5 | 0 | 2048 | VVol1 |
| | 002 | LDEV5 | 2048 | 2048 | VVol1 |
| | ... | ... | ... | ... | ... |
| | 101 | LDEV6 | 1073741824 | 2048 | NULL |
| | 102 | LDEV6 | 1073743872 | 2048 | NULL |
| | ... | ... | ... | ... | ... |
| ... | ... | ... | ... | ... | ... |

Fig. 13

VVol MANAGEMENT TABLE 5200 (STORAGE A)

| VVol ID (5210) | PERFORMANCE (5220) | SIZE (5230) | START VLBA (5240) | PoolID (5250) | SEGMENT ID (5260) | SEGMENT SIZE (5270) |
|---|---|---|---|---|---|---|
| VVol1 | LOW | 10TB | 0 | Pool1 | 001 | 2048 |
| | | | 2048 | Pool1 | 101 | 2048 |
| | | | ... | ... | ... | ... |
| VVol2 | HIGH | 10TB | 0 | Pool2 | 101 | 2048 |
| | | | ... | ... | ... | ... |
| ... | | ... | ... | ... | ... | ... |

Fig. 14

VVol MANAGEMENT TABLE 5200 (STORAGE B)

| VVol ID | PERFORMANCE | SIZE | START VLBA | PoolID | SEGMENT ID | SEGMENT SIZE |
|---|---|---|---|---|---|---|
| VVol1 | HIGH | 10TB | 0 | Pool1 | 001 | 2048 |
|  |  |  | 2048 | Pool1 | 002 | 2048 |
|  |  |  | ... | ... | ... | ... |
| ... |  | ... | ... | ... | ... | ... |

Fig. 15

REPLICATION PAIR MANAGEMENT TABLE 5400 (STORAGE A)

| PAIR ID | PRIMARY DEV ID | SECONDARY DEV ID |
|---|---|---|
| PAIR1 | VVol1 | VVol2 |
| ... | ... | ... |

Fig. 16

INTER-STORAGE PATH TABLE 5500 (STORAGE B)

| CONNECTION SOURCE WWN | CONNECTION DESTINATION STORAGE | CONNECTION DESTINATION WWN |
|---|---|---|
| WWN4 | STORAGE A | WWN3 |

SCHEMATIC DIAGRAM OF POOL MERGE ACCORDING TO EXAMPLE 1

Fig. 24

LU MAP TABLE 5000 (STORAGE A (AFTER PROCESSING))

| PortID | WWN | CONNECTION host WWN | LUN | DEV ID |
|---|---|---|---|---|
| 1 | WWN1 | h1 | ... | ... |
| ... | ... | ... | ... | ... |
| 3 | WWN3 | WWN4 | 1 | LDEV1 |
| | | | 2 | LDEV2 |
| | | | 3 | LDEV3 |
| | | | 4 | LDEV4 |
| ... | ... | ... | ... | ... |

POOL VOLUME MANAGEMENT TABLE 5100
(STORAGE B (AFTER PROCESSING))

| DEV ID | Pool ID | DISK TYPE | RAID LEVEL | RAID GROUP ID | ASSIGNMENT PROHIBITION DEV ID | Vol STATUS |
|---|---|---|---|---|---|---|
| LDEV5 | Pool1 | FC | RAID5 | RG1-1 | NONE | NORMAL |
| LDEV6 | Pool1 | FC | RAID5 | RG2-1 | VVol2 | NORMAL |
| ... | Pool1 | ... | ... | ... | ... | ... |
| ExVol1 | Pool1 | SATA | RAID1 | Ex1-1 | VVol3 | NORMAL |
| ExVol2 | Pool1 | SATA | RAID1 | Ex2-1 | VVol3 | NORMAL |
| ... | Pool1 | ... | ... | ... | ... | ... |
| ExVol3 | Pool1 | FC | RAID5 | Ex2-1 | NONE | NORMAL |
| ExVol4 | Pool1 | FC | RAID5 | Ex2-1 | NONE | NORMAL |
| ... | Pool1 | ... | ... | ... | ... | ... |
| ... | ... | ... | ... | ... | ... | ... |

VVol MANAGEMENT TABLE 5200 (STORAGE B (AFTER PROCESSING))

| VVol ID | PERFORMANCE | SIZE | START VLBA | PoolID | SEGMENT ID | SEGMENT SIZE |
|---|---|---|---|---|---|---|
| VVol1 | HIGH | 10TB | 0 | Pool1 | 001 | 2048 |
| | | | 2048 | Pool1 | 002 | 2048 |
| | | | ... | ... | ... | ... |
| VVol2 | LOW | 10TB | 0 | Pool1 | 201 | 2048 |
| | | | 2048 | Pool1 | 301 | 2048 |
| | | | ... | ... | ... | ... |
| VVol3 | HIGH | 10TB | 0 | Pool1 | 101 | 2048 |
| | | | ... | ... | ... | ... |
| ... | | ... | ... | ... | ... | ... |

Fig. 27

SEGMENT MANAGEMENT TABLE 5300
(STORAGE B (AFTER PROCESSING))

| Pool ID (5310) | SEGMENT ID (5320) | DEV ID (5330) | START LBA (5340) | SEGMENT SIZE (5350) | VVolID (5360) |
|---|---|---|---|---|---|
| Pool1 | 001 | LDEV5 | 0 | 2048 | VVol1 |
| | 002 | LDEV5 | 2048 | 2048 | VVol1 |
| | ... | ... | ... | ... | ... |
| | 101 | LDEV6 | 1073741824 | 2048 | VVol3 |
| | 102 | LDEV6 | 1073743872 | 2048 | NULL |
| | ... | ... | ... | ... | ... |
| | 201 | ExVol1 | 0 | 2048 | VVol2 |
| | 202 | ExVol1 | 2048 | 2048 | NULL |
| | ... | ... | ... | ... | ... |
| | 301 | ExVol2 | 1073741824 | 2048 | VVol2 |
| | 302 | ExVol2 | 1073743872 | 2048 | NULL |
| | ... | ... | ... | ... | ... |
| | 401 | ExVol3 | 0 | 2048 | NULL |
| | ... | ... | ... | ... | ... |
| | 501 | ExVol4 | 1073741824 | 2048 | NULL |
| | ... | ... | ... | ... | ... |
| ... | ... | ... | ... | ... | ... |

REPLICATION PAIR MANAGEMENT TABLE 5400
(STORAGE B (AFTER PROCESSING))

Fig. 29

SCREEN FOR POOL MERGE   8000

MERGE DESTINATION STORAGE ID: [STORAGE B ▼]  8100

MERGE ARGET POOL.
○ MERGE ALL POOLS  8020
● MERGE THE FOLLOWING POOLS

| | STORAGE ID | Pool ID | UTILIZATION | DISK TYPE | RAID Lv | VVol ID | REPLICATION PAIR |
|---|---|---|---|---|---|---|---|
| ✓ | STORAGE A | Pool1 | 20% | SATA | RAID1 | VVol1 | DETAIL |
| ☐ | STORAGE B | Pool2 | 70% | FC | RAID5 | VVol2 | DETAIL |
| ☐ | STORAGE C | Pool1 | 50% | SATA, FC | RAID1, RAID6 | VVol1 VVol2 | NONE |
| | ... | ... | ... | ... | ... | ... | ... |

8030

OPTION: 8040
✓ Vol REQUIRING HIGH PERFORMANCE UTILIZES PoolVol IN MERGE DESTINATION STORAGE

[APPLY] [CANCEL]

Fig. 36
BEFORE MERGE
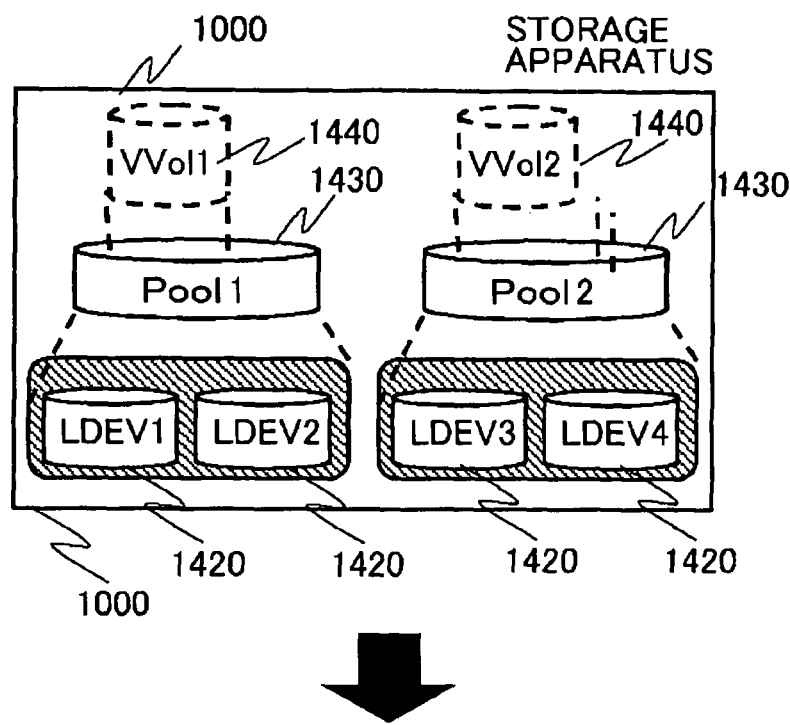
AFTER MERGE
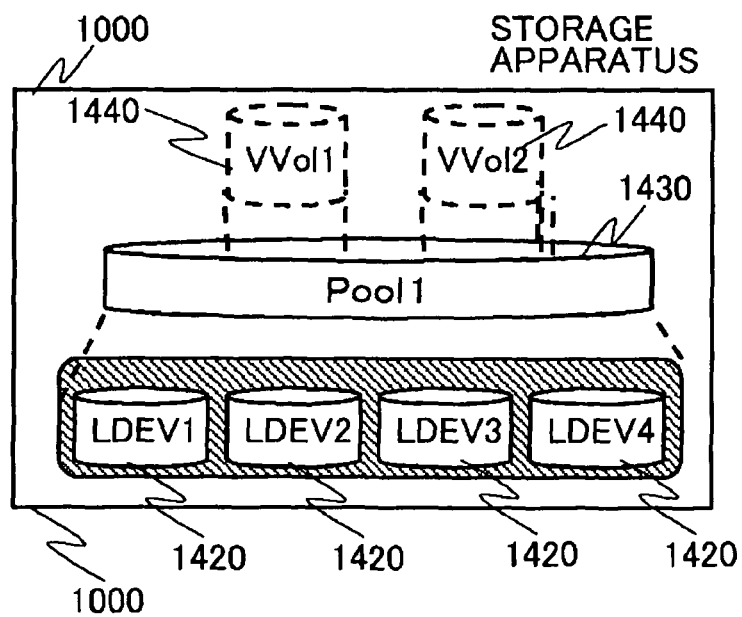

STORAGE SYSTEM AND METHOD FOR EFFICIENTLY UTILIZING STORAGE CAPACITY WITHIN A STORAGE SYSTEM

TECHNICAL FIELD

The present invention relates to a storage system and a method for operating a storage system, and particularly relates to a storage system and a method for operating a storage system which enable a storage capacity of a storage apparatus to be more efficiently utilized by an external apparatus.

BACKGROUND ART

A storage system for providing a host computer with a storage area for storing data includes a number of physical disks such as hard disks for storing data. The storage system uses a RAID (Redundant Array of Independent (or Inexpensive) Disks) technology to make storage areas of the multiple physical disks redundant, and form a RAID group. Furthermore, the storage system creates a logical volume from a part of the RAID group as a storage area with a capacity demanded by the host computer, and provides the host computer with the created logical volume.

As for the storage system, there is a thin provisioning technology. In the thin provisioning, the logical volume is not provided to the host computer as a storage area with a fixed capacity. Instead, in this technology, a virtual logical volume (virtual volume, hereinafter the "VVol") is provided to the host computer, and in response to processing to write data into the storage system from the host computer and the like, a storage area using a segment as a unit is assigned to the virtual volume from a storage area (volume pool) created from multiple logical volumes. There has been a storage system capable of dynamically extending a storage capacity to be provided to a host computer by use of the thin provisioning technology (for example, Patent Citation 1).

Note that the segment is a storage area created by dividing the logical volume (Pool Volume, hereinafter the "PoolVol") included in the volume pool into areas each having an appropriate capacity by using a logical block address (hereinafter, the "LBA") or the like. Here, the LBA is an address used for specifying a position in the logical volume when the host computer reads and writes data from and into the storage system.

Moreover, there has been known the following technique (for example, Patent Citation 2). Specifically, in two storage systems (a storage system A and a storage system B) which are connected via a data communication network such as a SAN (Storage Area Network), a logical volume included in the storage system A is associated with an external volume that is a virtual volume created in and by the storage system B. Thus, the logical volume in the storage system A is incorporated by the storage system B, and the incorporated logical volume is provided to a host computer and the like as a volume in the storage system B (hereinafter referred to as "external connection").

The use of the external connection technique can extend a capacity of the storage system B incorporating the logical volume. Moreover, since the storage system B that has incorporated the logical volume provides the host computer with the logical volume for the host computer, management of the storage systems is facilitated.

Patent Citation 1: Japanese Patent Application Laid-open Publication No. 2003-15915

Patent Citation 2: Japanese Patent Application Laid-open Publication No. Hei 10-283272

DISCLOSURE OF INVENTION

Technical Problem

When there are a storage system A including a volume pool and a virtual volume using the volume pool and a storage system B similarly including a volume pool and a virtual volume, utilization of volume pool differs between the two systems. While there is the storage system A having the volume pool with low utilization, there is also the storage system B having the volume pool with high utilization. Furthermore, when performance of the storage system B is higher than that of the storage system A, there is a case where it is desirable to eliminate uneven utilization of storage areas and to achieve collective management using the storage system B with better performance by incorporating data stored in the virtual volume in the storage system A and the storage area used by the volume pool in the storage system A into the volume pool in the storage system B.

In order to achieve the above by use of the conventional technology, it is required to take the following procedures. Specifically, first, a virtual volume with the same capacity as that of the virtual volume in the storage system A is created in the storage system B, and the virtual volume in the storage system A is copied to the virtual volume in the storage system B. Thereafter, the virtual volume and the volume pool in the storage system A are deleted. Subsequently, the pool volume forming the volume pool in the storage system A is externally connected to the storage system B, and thus added to the volume pool in the storage system B.

The above procedures are required to be taken for all virtual volumes in the volume pool in the storage system A, and also required to wait until volume replication is completed. Thus, there is a problem that it takes time before the volume pool storage area and data in the storage system A can be utilized by the storage system B.

As another method, it is also possible to achieve even utilization by adding specific one of the pool volumes in the storage system A to the volume pool in the storage system B. However, this method has a problem that data I/O occurs and performance is lowered since, in order to remove the specific pool volume from the volume pool, all the data stored in the pool volume is moved to another pool volume in the volume pool in the storage system A.

Technical Solution

In order to solve the foregoing and other problems, one aspect of the invention of the present application is a storage system comprising a first storage apparatus including a storage controller that manages a first pool that is a storage area provided by a plurality of physical disks and managed as a set of unit storage areas forming the storage area, and at least one logical volume created from the unit storage areas in the first pool, and the storage controller including a first configuration information holding unit having first configuration information holding association among a pool identifier for identifying the first pool, a volume identifier for identifying the logical volume created from the first pool, and a unit storage area identifier for identifying the unit storage areas forming the logical volume, and a second storage apparatus communicably connected to the first storage apparatus, and including a storage controller that manages a second pool having the same configuration as that of the first pool and at least one logical volume created from the unit storage areas in the second pool, and the storage controller including a second configuration information holding unit having second configuration information holding association among a pool identifier for identifying the second pool, a volume identifier for identifying the logical volume created from the second pool, and a unit storage area identifier for identifying the unit storage areas forming the logical volume, wherein the second storage apparatus includes an external connection processing part that specifies the logical volume included in the first pool by acquiring the first configuration information from the first configuration information holding unit in the first storage apparatus, and associates an external volume identifier with the specified logical volume in the first storage apparatus, the external volume identifier being used by the storage controller to identify and manage the logical volume as an external volume that is a virtual volume in the second storage apparatus, and a pool merge processing part that rewrites the acquired first configuration information so that the volume identifier of the logical volume included in the first pool is rewritten into the external volume identifier, and adds contents of the rewritten first configuration information to the second configuration information in order to enable the second storage apparatus to utilize the logical volume created from the first pool.

Advantageous Effects

According to the present invention, a storage capacity of a storage apparatus can be more efficiently utilized by an external apparatus.

BRIEF DESCRIPTION OF THE DRAWINGS

FIG. 8 is a diagram showing an example of a LU map table 5000 in the storage apparatus A (1000).

FIG. 9 is a table showing an example of a PoolVol management table 5100 in the storage apparatus A (1000).

FIG. 10 is a table showing an example of a PoolVol management table 5100 in the storage apparatus B (1000).

FIG. 11 is a table showing an example of a segment management table 5300 in the storage apparatus A (1000).

FIG. 12 is a table showing an example of a segment management table 5300 in the storage apparatus B (1000).

FIG. 13 is a table showing an example of a VVol management table 5200 in the storage apparatus A (1000).

FIG. 14 is a table showing an example of a VVol management table 5200 in the storage apparatus B (1000).

FIG. 15 is a table showing an example of a replication pair management table 5400 in the storage apparatus A (1000).

FIG. 16 is a table showing an example of an inter-storage apparatus path table 5500 in the storage apparatus B (1000).

FIG. 24 is a diagram showing an example of a LU map table 5000 in the storage apparatus A (1000) after the pool merge processing.

FIG. 25 is a diagram showing an example of a PoolVol management table 5100 in the storage apparatus B (1000) after the pool merge processing.

FIG. 26 is a diagram showing an example of a VVol management table 5200 in the storage apparatus B (1000) after the pool merge processing.

FIG. 27 is a diagram showing an example of a segment management table 5300 in the storage apparatus B (1000) after the pool merge processing.

FIG. 29 is a diagram showing an example of a pool merge selection screen outputted by the management computer 2000 of Example 1.

FIG. 36 is a diagram showing an example of a processing flow in the case of merging multiple pools within a single storage apparatus 1000 according to Example 4 of the present invention.

EMBODIMENTS OF INVENTION

With reference to the accompanying drawings, an embodiment of the invention of the present application will be described below by use of examples.

Example 1

First, a first example of the present invention will be described.

In Example 1, as to storage apparatuses A and B, each having a volume pool (hereinafter simply referred to as a "Pool") described in connection with the related art, the storage apparatus B acquires configuration information held by the storage apparatus A, and externally adds a pool volume (hereinafter referred to as a "PoolVol") created from the Pool of the storage apparatus A to the storage apparatus B.

Furthermore, the configuration information acquired from the storage apparatus A is converted and then utilized by the storage apparatus B. Thus, a virtual volume provided by the storage apparatus A can be utilized by the storage apparatus B. This configuration makes it possible to omit processing of copying data stored in a virtual volume of the storage apparatus B into the virtual volume of the storage apparatus A.

As a result, a Pool newly created by merging the Pool and the virtual volume of the storage apparatus A with the Pool of the storage apparatus B can be utilized by the storage apparatus B.

Note that the first example and other examples described below are examples of the embodiment of the present invention, and are not intended to limit the present invention in any way.

Figure 1:
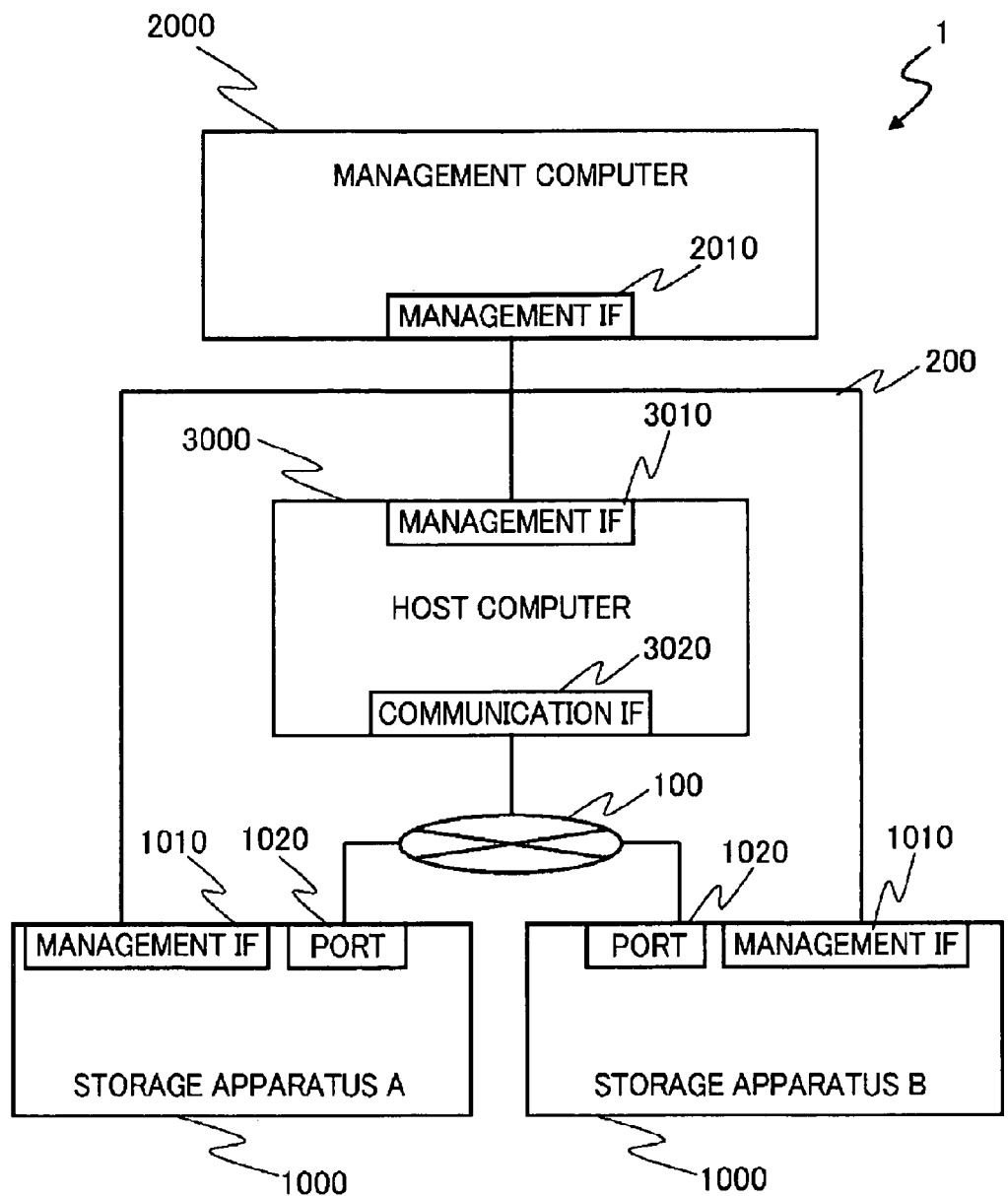
FIG. 1 is a block diagram showing an overall configuration of a storage system 1 according to Example 1 of the present invention.

With reference to FIG. 1, a storage system according to the first example of the present invention will be described. FIG. 1 is a block diagram showing an overall configuration of a storage system 1 according to the first example of the present invention.

The storage system 1 according to the first example includes storage apparatuses A and B, which are storage apparatuses 1000, and a management computer 2000 connected to the storage apparatuses A and B to manage those apparatuses. A host computer 3000 utilizes volumes provided by the storage apparatuses 1000 included in the storage system 1.

The storage apparatuses A and B are the same storage apparatuses 1000 in terms of a hardware configuration, but are different from each other in terms of software for implementing this example as described later. For this reason, as for a configuration of each storage apparatus itself, each of the storage apparatuses A and B will be called the storage apparatuses 1000. Meanwhile, when it is required to make a distinction between the storage apparatuses about functions in this example, the storage apparatuses will be separately called the storage apparatus A and the storage apparatus B.

A communication port 1020 of each storage apparatus 1000 and a communication interface (hereinafter the "communication IF") 3020 of the host computer 3000 are connected to each other via a data network 100 such as a SAN and a LAN (Local Area Network). Note that the communication IF 3020 differs depending on the network to be connected. The communication IF 3020 is a HBA (Host Bus Adapter) in the case of the SAN, and is a MC (Network Interface Card) in the case of the LAN.

Moreover, a management IF 1010 of each storage apparatus 1000 and a management IF 2010 of the management computer 2000 are connected to each other via a management network 200 such as a LAN.

Note that, as described above, in the storage system 1 according to this example, the host computer 3000 is not included as a constituent element. In addition, the management computer 2000 may be configured as an apparatus independent of the storage apparatuses 1000 as in this example or may be included in the storage apparatuses 1000 as a part thereof. Moreover, the data network 100 and the management network 200 may be configured as the same network. Furthermore, the storage system 1 may include three or more storage apparatuses 1000.

Figure 2:
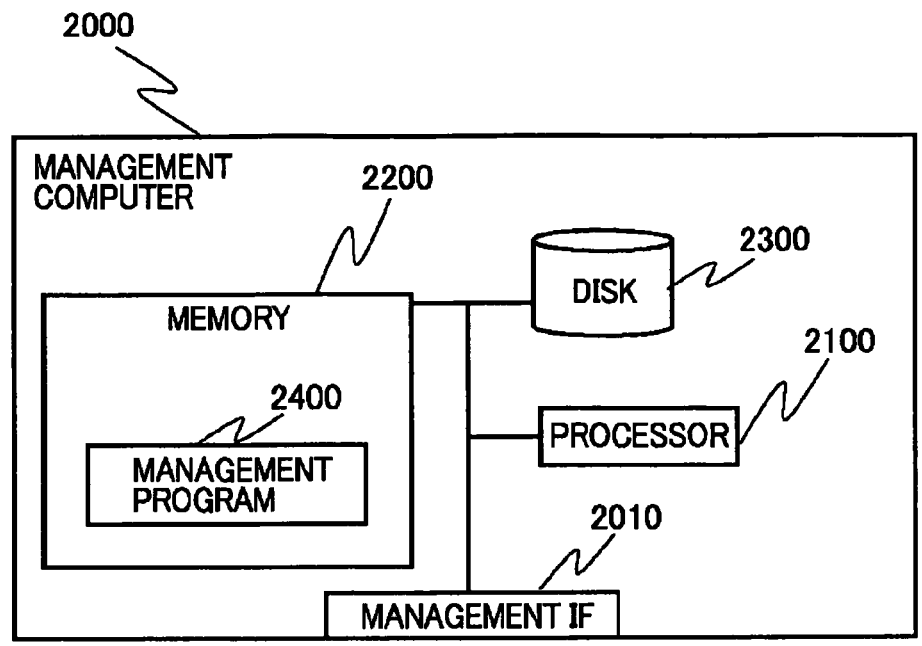
FIG. 2 is a block diagram of an inside of a management computer 2000.

Next, the management computer 2000 will be described. FIG. 2 shows a block diagram of the management computer 2000. The management computer 2000 is a computer including a processor 2100 for performing arithmetic processing, a memory 2200 that is a main storage unit for temporarily storing data, an auxiliary storage unit 2300 for storing data, and the management IF 2010 for connecting the computer to an external network.

The processor 2100 is a central processing unit for processing data, such as a MPU (Main Processing Unit) and a CPU (Central Processing Unit). The memory 2200 is a storage device for storing data such as management programs to be described later and various tables to be utilized in this example, and includes a ROM (Read Only Memory) and a RAM (Random Access Memory), for example. The auxiliary storage unit 2300 is a storage device such as a hard disk drive, and stores the data such as the management programs and various tables. The management IF 2010 is a communication interface provided for communicating with the storage apparatus 1000 and the host computer 3000 through the network 200.

As the management computer 2000, for example, a personal computer, a work station or the like can be adopted. The management computer 2000 may include an input device such as a keyboard and an output device such as a display.

The management computer 2000 includes a management program 2400 in the memory 2200. The management program 2400 is a program for managing the storage apparatus 1000 and the host computer 3000. Specific processing to be implemented by the management program 2400 will be described later with reference to FIG. 18. The management program 2400 is executed by being read from the auxiliary storage unit 2300 into the memory 2200 by the processor 2100.

Figure 3:
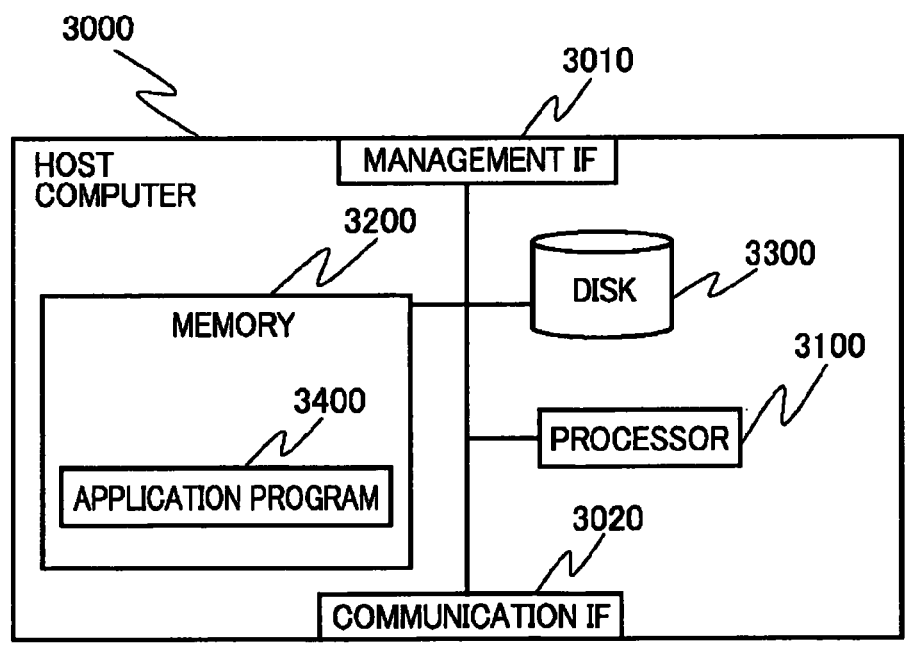
FIG. 3 is a block diagram of an inside of a host computer 3000.

Next, the host computer 3000 will be described. FIG. 3 shows a block diagram of the host computer 3000.

The host computer 3000 is a computer including a processor 3100 for performing arithmetic processing, a memory 3200 that is a main storage unit for temporarily storing data, an auxiliary storage unit 3300 for storing data, a management IF 3010 for connecting the computer to an external network, and the communication IF 3020.

As the host computer 3000, for example, a personal computer, a work station or the like can be adopted. The host computer 3000 may include an input device such as a keyboard and an output device such as a display.

The processor 3100, the memory 3200, the auxiliary storage unit 3300 and the management IF 3010 have the same configurations as those in the management computer 2000. The communication IF 3020 is a communication interface for inputting and outputting data from and to the storage apparatus 1000 through the network 100.

The host computer 3000 includes an application program 3400 in the memory 3200. The application program 3400 is always stored in the auxiliary storage unit 3300, and executed by being read from the auxiliary storage unit 3300 into the memory 3200 by the processor 3100. The application program 3400 is application software including, for example, database software and the like. Data to be processed by the application program 3400 is stored in a volume that is a storage area in the storage apparatus 1000.

Figure 4:
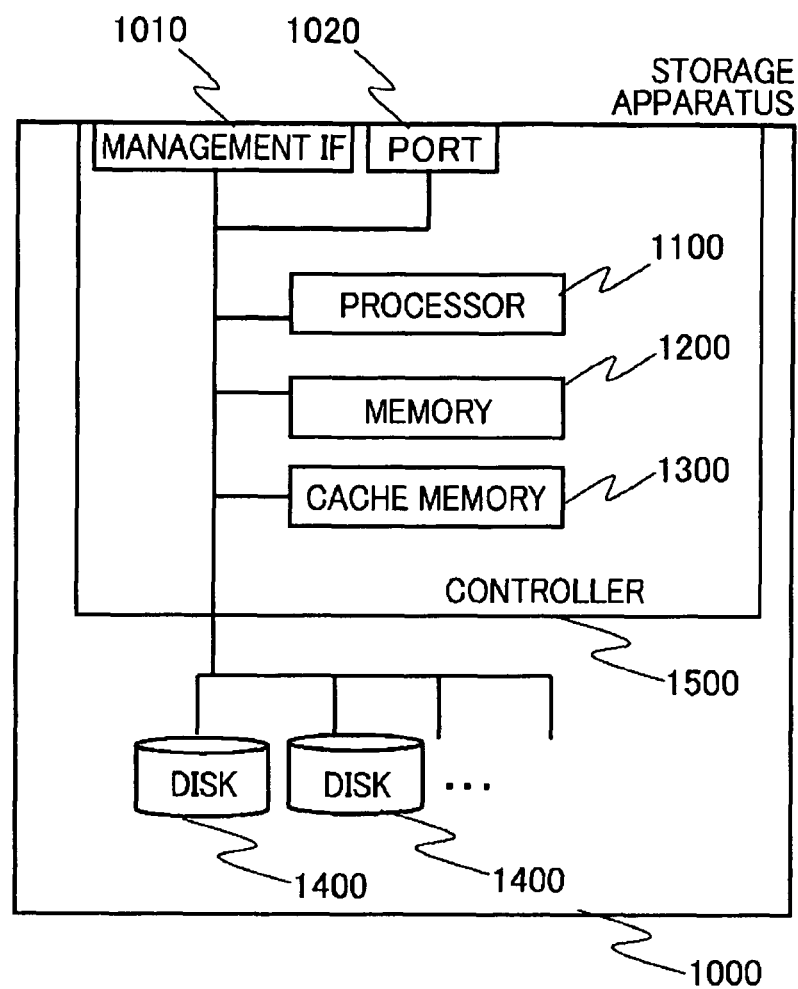
FIG. 4 is a block diagram showing a hardware configuration inside a storage apparatus 1000.

Next, the storage apparatus 1000 will be described. FIG. 4 is a block diagram showing a configuration of the storage apparatus 1000.

The storage apparatus 1000 includes multiple physical disks 1400 which provide physical storage areas. Each of the physical disks 1400 is formed of a hard disk drive, for example, but may be formed of another storage medium such as a semiconductor storage device.

The storage apparatus 1000 includes, in addition to the management IF 1010 and the communication port 1020: a processor 1100 for performing arithmetic processing; a memory 1200 that is a temporary storage area having multiple management tables and later-described multiple processing parts, which are executed by the processor 1100; a cache memory 1300 for speeding up data provision to the host computer 3000 by temporarily storing data in response to a data IO request from the host computer 3000, the request being received by the communication port 1020; and a controller 1500 for managing data input and output from and to the physical disks 1400.

Note that multiple management IFs 1010 and communication ports 1020 may be provided. Moreover, although not shown in the drawing, the management IF 1010 sometimes includes a computer called a service processor (hereinafter the "SVP") provided with a function of monitoring a data processing state inside the storage apparatus 1000, a function of issuing an operation command required for maintenance of the storage apparatus 1000, and the like.

Figure 5:
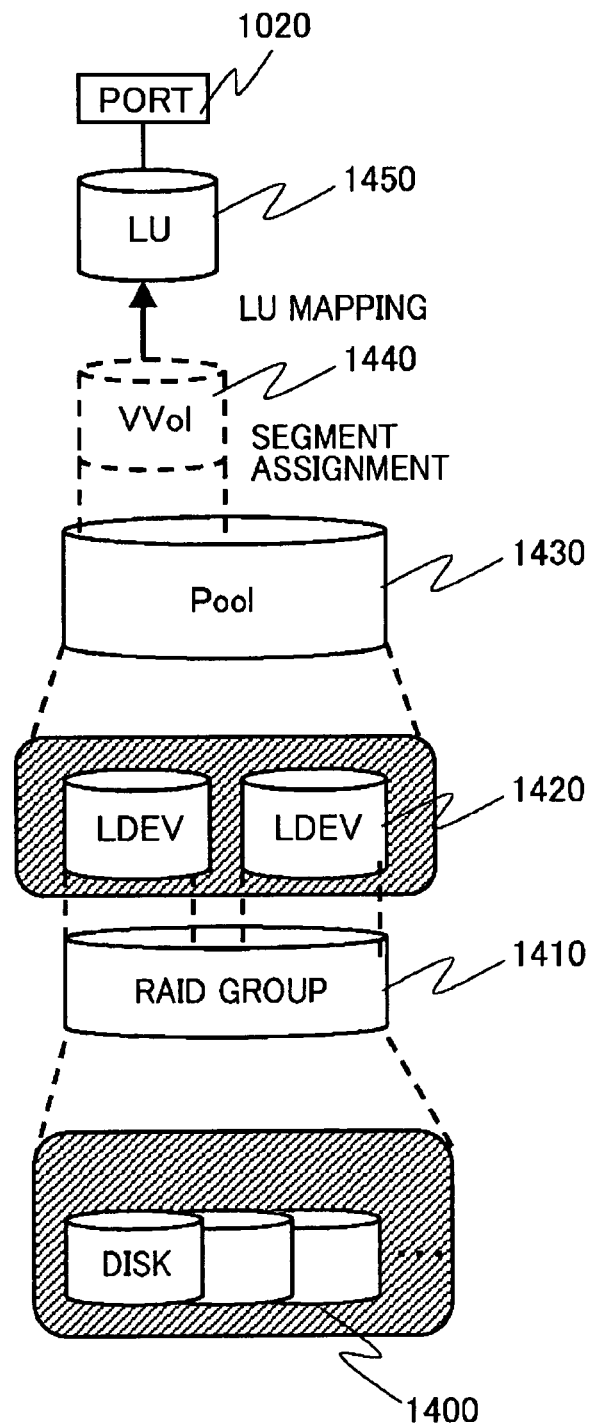
FIG. 5 is a schematic diagram of a volume that is a storage area provided by the storage system 1 according to Example 1.

Next, a configuration of a storage area provided by each of the storage apparatus 1000 will be described. FIG. 5 schematically shows a configuration of a volume and the like provided by the storage apparatus 1000 in this example.

The multiple physical disks 1400 included in the storage apparatus 1000 are made redundant as RAID of an appropriate type to form a RAID group 1410. The RAID group 1410 is divided into units called logical blocks, and address information such as a logical block address (hereinafter the "LBA") is given to each of the logical blocks. In the RAID group 1410, LDEVs (Logical Devices, also called "logical volumes") 1420 are created, which are storage areas divided into LBA regions of suitable size.

Furthermore, in order to achieve a thin provisioning function, a storage area Pool 1430 is created from the multiple LDEVs 1420. Each of the LDEVs 1420 included in the Pool 1430 is also called a PoolVol, and is divided into unit storage areas called segments, each of which is created from a predetermined number of logical blocks. The controller (storage controller) 1500 of the storage apparatus 1000 controls the LDEV 1420 by use of the segment.

As to a VVol (Virtual Volume) 1440 that is a virtual volume, unlike the LDEV 1420 having its storage area capacity fixed when it is created, a storage capacity of the VVol 1440 is dynamically extended by assigning the segment included in the Pool 1430 thereto as needed.

The LDEV 1420 or the VVol 1440 is associated with a LU 1450 (Logical Unit) by a later-described LU map processing part, which is provided in the controller 1500. The LDEV 1420 or the VVol 1440 is provided to the host computer 3000 as a storage area for data storage.

Note that the LU 1450 is provided with a LUN (Logical Unit Number) uniquely set for each communication port 1020 assigned thereto. The LUs 1450 are distinguished from each other by the LUNs, and the host computer 3000 can recognize each LU 1450 by use of the LUN.

The host computer 3000 uses the LUN and the LBA to execute data write into or data read from the LDEV 1420 or the VVol 1440 associated with the LU 1450 connected to the communication port 1020, the LBA being an address value of the LDEV 1420. Here, association between the LDEV 1420 or the VVol 1440 and the LUN of the LU 1450 is called "LU mapping."

Figure 6:
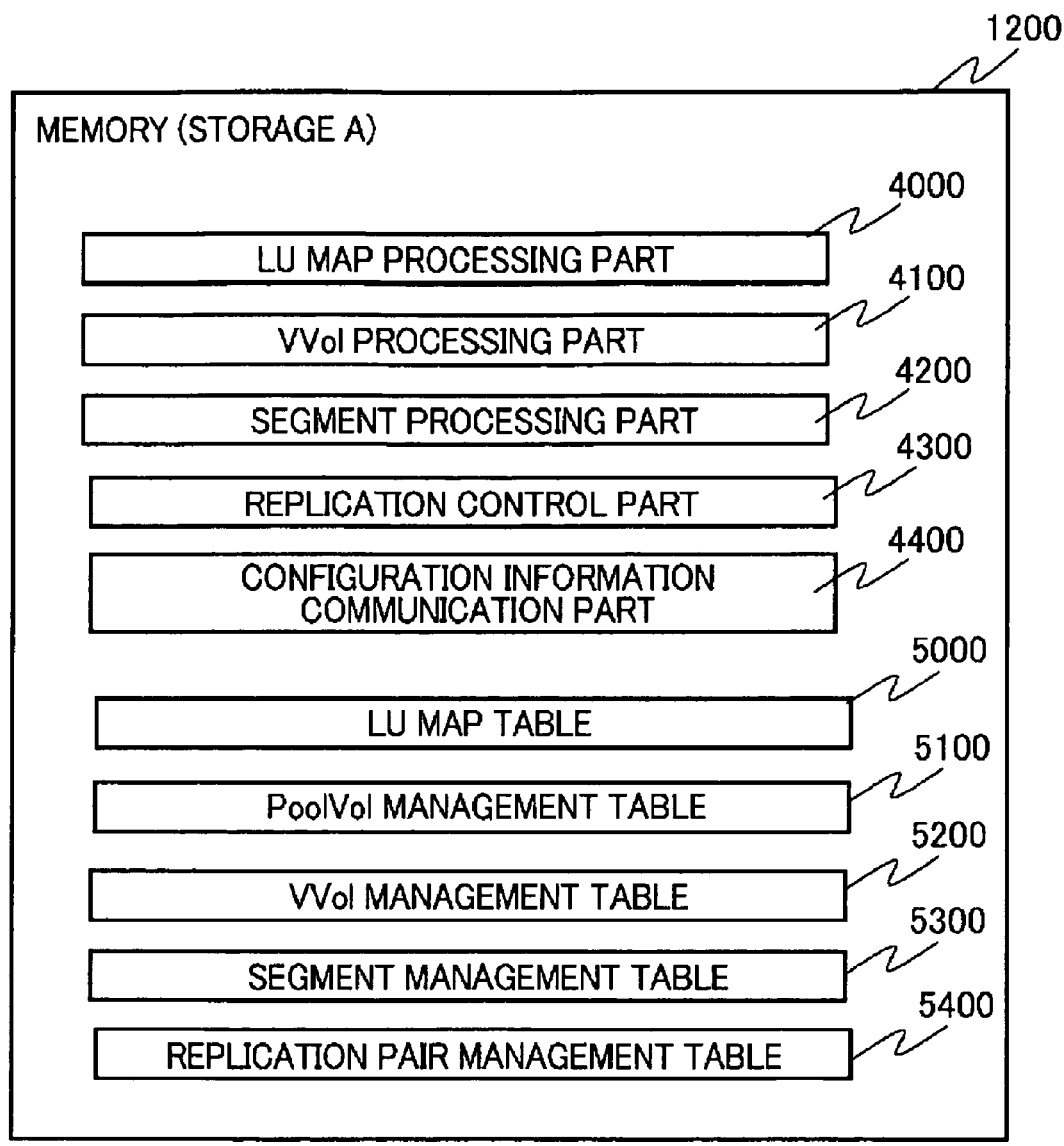
FIG. 6 is a diagram showing processing units and tables in a memory 1200 of a storage apparatus A (1000).
Figure 7:
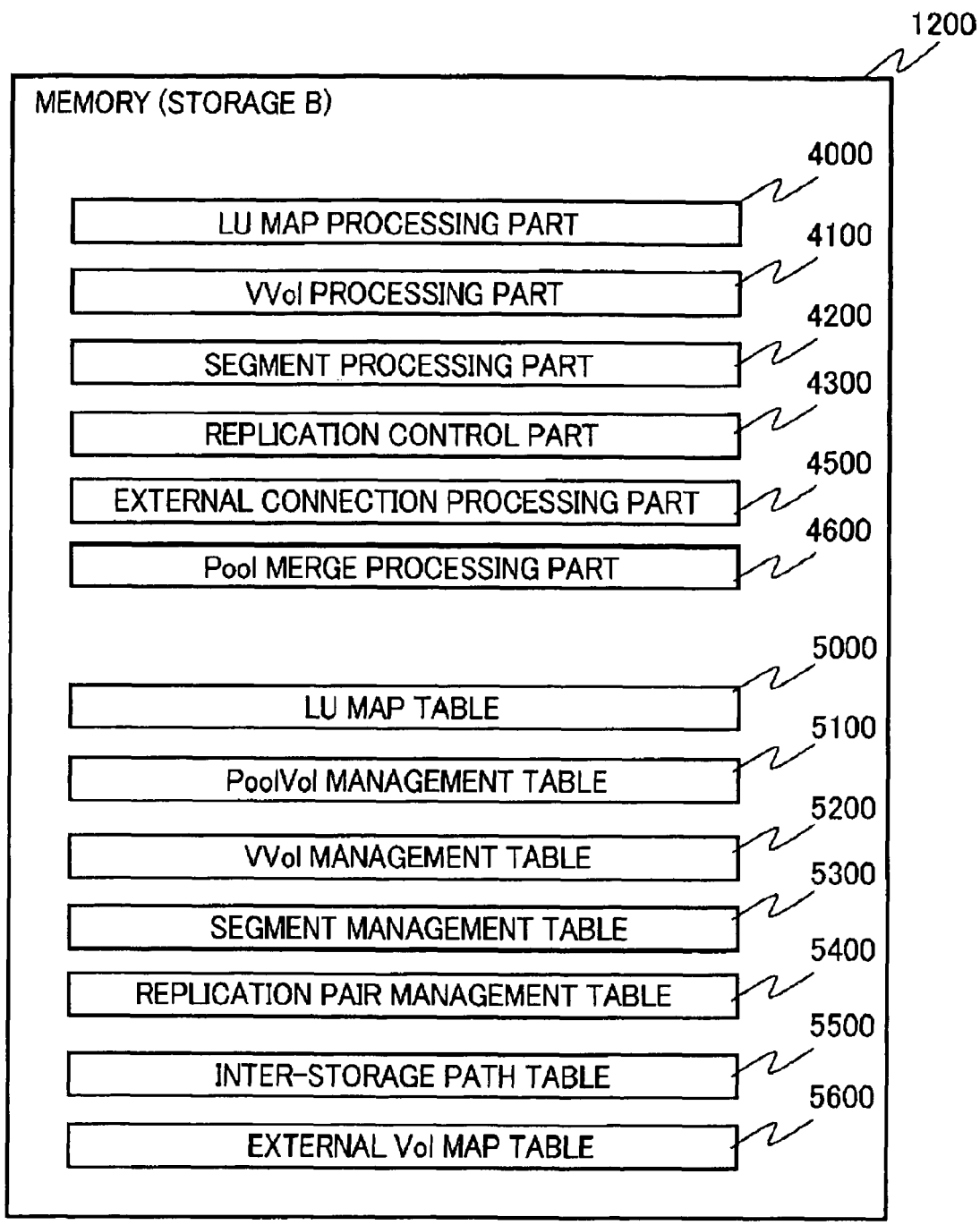
FIG. 7 is a diagram showing processing units and tables in a memory 1200 of a storage apparatus B (1000).

Next, description will be given of processing parts in this example and of management tables used by the processing parts, all of which are implemented by a software program stored in the memory 1200 of the storage apparatus 1000. FIG. 6 shows processing parts and management tables stored in the memory 1200 of the storage apparatus A. FIG. 7 shows processing parts and management tables stored in the memory 1200 of the storage apparatus B.

A LU map processing part 4000 uses a LU map table 5000 shown in FIG. 8 to be described later to manage LU mapping that specifies association between the LUN of the LU 1450 recognized by the host computer 3000 connected to the communication port 1020 and a DEV ID that is a LU identifier used in the storage apparatus A (1000).

FIG. 8 shows an example of the LU map table 5000 included in the storage apparatus A of Example 1.

The LU map table 5000 includes a Port ID 5010, a storage WWN (World Wide Name) 5020, a connection host WWN 5030, a LUN 5040 and a DEV ID 5050 that is an identifier of the LDEV or the VVol within the storage apparatus A (1000), all of which will be described later. The LU map table 5000 shows a connection relationship from the LDEV 1420 to the communication port 1020 within the storage apparatus 1000 schematically shown in FIG. 5.

The Port ID 5010 is an identifier uniquely assigned to the communication port 1020 included in the storage apparatus 1000. The storage WWN 5020 is a WWN of the storage apparatus 1000, which is given for each Port ID 5010, and is an identifier uniquely given on the SAN (network 100). The connection host WWN 5030 is an identifier of the communication IF 3020 in the host computer 3000 connected to each communication port 1020.

The LUN 5040 is an identifier uniquely given to the LU 1450 created in the storage apparatus 1000 recognized by the host computer 3000. The DEV ID 5050 is an identifier given to the LDEV 1420 or the VVol 1440 associated with the LU 1450 in the storage apparatus 1000.

For example, in the example of FIG. 8, "WWN1" is given as the storage WWN to "Port1" that is the communication port 1020 of the storage apparatus A (1000), and the port is connected to the host computer 3000 in which the WWN of the communication IF 3020 is "h1". Moreover, the LU of the storage apparatus A (1000) recognized by the host computer 3000 is "LUN1," and an identifier "VVol1" that is a VVol provided by the storage apparatus 1000 is associated with "LUN1".

Note that the storage apparatus B connected to the storage apparatus A may be configured to manage the LU map processing part 4000 and the LU map table 5000 in the storage apparatus A through the network 200 and the management IF 1010.

A segment processing part 4200 uses a PoolVol management table 5100 and a segment management table 5300, both of which will be described later, to manage a configuration of the LDEVs that form the Pool 1430 and a association relationship between the segment assigned to the VVol 1440 and the LDEV. Moreover, the segment processing part 4200 adds or deletes the LDEVs forming the Pool 1430.

FIG. 9 shows the PoolVol management table 5100 managed by the segment processing part 4200 in the storage apparatus A, and FIG. 11 shows the segment management table 5300. Moreover, FIG. 10 shows the PoolVol management table 5100 managed by the segment processing part 4200 in the storage apparatus B, and FIG. 12 shows the segment management table 5300.

Each of the tables will be described below by use of the PoolVol management table 5100 shown in FIG. 9, that is a constituent element of the storage apparatus A shown in FIG. 1 in this example.

The PoolVol management table 5100 includes items such as a DEV ID (volume identifier) 5110, a Pool ID (pool identifier) 5120, a disk type 5130, a RAID level 5140, a RAID group ID 5150 and an assignment prohibition VVol ID 5160.

The PoolVol management table 5100 manages in which Pool 1430 with the identifier (Pool ID 5120) created in the storage apparatus 1000 the LDEV having the DEV ID 5110 used as the PoolVol is used.

Furthermore, the PoolVol management table 5100 includes the disk type 5130, the RAID level 5140 and RAID group ID 5150 as attribute information on the LDEV indicated by each DEV ID 5110. The disk type 5130 is a physical type of the disk 1400 storing data on the LDEV. The RAID level 5140 is a type of RAID indicating a redundancy degree. The RAID group ID 5150 is an identifier of the RAID group 1410 including the LDEV. Moreover, in the assignment prohibition VVol ID 5160, described is an identifier of the VVol for which assignment of a segment that is a part of the later-described LDEV is prohibited. The assignment prohibition VVol ID 5160 will be described in detail in a later-described processing flow (processing step 7370) of this example.

The PoolVol management table 5100 further includes as an item to be managed a status 5170 of the volume of PoolVol. The volume status 5170 indicates whether PoolVol is able to normally respond to data IO from the host computer 3000. As the volume status 5170 indicative of the PoolVol status, "Normal" is stored when PoolVol is able to respond to the data IO from the host computer 3000, and "Failure" is stored when PoolVol is unable to respond to the data IO due to any defect therein. It is to be noted such a construction may be employed that a management IF 1010 of the storage apparatus 1000 is provided with an SVP which collects the information on whether PoolVol is normal or not.

Note that the disk type 5130 indicates a data communication method of the physical disk 1400 that is the storage medium, the method including, for example, SATA (Serial ATA), FC (Fiber Channel) and the like. Comparing the SATA and the FC, the FC generally has a data transfer rate faster than that of the SATA. Moreover, in the RAID level 5140, described is an identifier indicating a redundancy method such as RAID1 (mirroring).

Moreover, when multiple application programs 3400 are operated in the host computer 3000, the computer is configured so as to record an application program identifier for identifying the application program 3400 utilizing corresponding LDEV 1420 as a data storage area. Thus, the application program identifier can be utilized as one piece of attribute information to be described later in Example 2. In this case, by creating storage area from the same Pool for each tier specified for corresponding application program 3400, an effect that data IO performance can be equalized for each of the tiers, and the like can be achieved.

With reference to FIG. 9, the Pool 1430 having the Pool ID 5120 of "Pool1" in the storage apparatus A includes the LDEV having the DEV ID 5110 of LDEV1 or LDEV2. The LDEV1 included in the Pool 1430 uses a physical disk having the disk type 5130 of the SATA, and takes a redundant configuration in which the RAID level 5140 is RAID1. The LDEV1 is also indicated that the RAID group ID 5150 is created from the RAID group having RG 1-1. Moreover, "none" indicating that there is no VVol for which assignment of the segment in the LDEV1 is prohibited is described in the assignment prohibition VVol ID 5160.

Next, the segment management table 5300 will be described by using, as an example, the segment management table 5300 shown in FIG. 11, which is a constituent element of the storage apparatus A of Example 1.

In the segment management table 5300, recorded are items including a Pool ID 5310, a segment ID 5320, a DEV ID 5330, a start LBA 5340, a segment size 5350 and a VVol ID 5360.

The segment management table 5300 is managed for each identifier (Pool ID 5310) of the Pool 1430 created in the storage apparatus 1000.

The segment ID 5320 is an identifier of a segment assigned to the Pool 1430 indicated by the Pool ID 5310. The DEV ID 5330 is an identifier of the LDEV 1420 associated with the segment indicated by the segment ID 5320. The start LBA 5340 is a start address (LBA) of the storage area of LDEV 1420 indicated by the DEV ID 5330. The segment size 5350 is a capacity of each segment indicated by the segment ID 5320. The VVol ID (virtual volume identifier) 5360 is an identifier which means the DEV IDs 5330 are an identifier set of only the particular VVol, and is an identifier of the VVol 1440 to which the segment indicated by the segment ID 5320 is assigned.

Note that, in the VVol ID 5360, when a segment is assigned to a certain virtual volume 1440 an identifier of the virtual volume VVol is described, and when no segment is assigned to the virtual volume 1440 "NULL" is described, for example, as a control character.

The example of FIG. 11 shows the following. Specifically, a segment having the segment ID 5320 of "001" is included in the Pool 1430 having the Pool ID 5310 of "Pool1" in the storage apparatus A. In addition, areas 0 to 2048 among the LBAs of the LDEVs having the DEV ID 5330 of "LDEV1" are assigned to the segment. Moreover, the segment is assigned to the VVol having the VVol ID of "VVol1".

Here, referring back to FIG. 6, a VVol processing part 4100 will be described. The VVol processing part 4100 uses a later-described VVol management table 5200 to create a VVol 1440 to be provided to the host computer 3000, controls a capacity of the created VVol 1440 by assigning a segment thereto, and also manages the VVol 1440.

In Example 1, FIG. 13 shows a VVol management table 5200 in the storage apparatus A, and FIG. 14 shows a VVol management table 5200 in the storage apparatus B. These tables are only examples, and are not intended to limit the present invention.

The VVol management table 5200 will be described with reference to FIG. 13 showing the VVol management table 5200 in the storage apparatus A.

The VVol management table 5200 includes a VVol ID 5210, a performance 5220, a size 5230, a start VLBA 5240, a Pool ID 5250, a segment ID 5260 and a segment size 5270.

The VVol ID 5210 is an identifier given to each VVol 1440. The performance 5220 is a performance required for each VVol, and a value "high" means that a high performance is required. This value is previously set by a system administrator using a management program and the like. The performance 5220 is distinguished between "high" and "low" based on, for example, a data transfer rate or a level of reliability required. In terms of the data transfer rate, a FC disk is superior to a SATA disk. Moreover, in terms of reliability, LUs in the same package are superior to externally connected LUs. As described later, from this perspective, the LDEVs 1420 creating segments that form the same VVol can be provided.

The size 5230 is a capacity set for a VVol when the VVol is first created. The start VLBA 5240 is a logical block address (Virtual Logical Block Address, hereinafter the "VLBA") for specifying a virtual block of the VVol 1440 from and to which the host computer 3000 inputs and outputs data. The Pool ID 5250 is an identifier given to the Pool 1430 which assigns a segment to the VVol 1440. The segment ID 5260 and the segment size 5270 are an identifier and a capacity of a segment, respectively, which is associated with the VLBA of the VVol 1440 indicated by the VVol ID 5210. Note that, when there is only one Pool 1430 created in the storage apparatus 1000, the VVol management table 5200 does not have to include the Pool ID 5250.

Accordingly, for example, when the host computer 3000 requests data read from a virtual block specified by a start VLBA "3048 (=2048+1000)" of the VVol "VVol1", the VVol processing part 4100 in the storage apparatus 1000 can know, by referring to the VVol management table 5200, that data is stored in a segment having a segment ID 5260 of "101" assigned to the Pool having the Pool ID 5250 of "Pool1".

Furthermore, the VVol processing part 4100 in the storage apparatus 1000 can know, by referring to the segment management table 5300, that the segment "101" is a logical block specified by the LBA value "1073741824+1000" of the LDEV "LDEV2" and that data is stored in the specified logical block.

As described above, the VLBA value of the VVol 1440 and the LBA value of the LDEV 1420 are associated with each other by the VVol management table 5200.

In such a case as where there occurs processing of data write into the VLBA of the VVol 1440 having no segment assigned thereto, the VVol processing part 4200 refers to the segment management table 5300 and assigns a segment that is not being utilized (in other words, a segment having "NULL" described in the VVol ID 5360) to the VVol 1440. Thus, the VVol processing part 4200 can dynamically extend the capacity of the VVol 1440.

Next, a replication control part 4300 and a replication pair management table 5400 will be described.

The replication control part 4300 performs processing regarding replication of data by the volume to the LDEV 1420 and the VVol 1440. The replication processing includes: synchronous replication that guarantees that the information is always the same between two volumes; and asynchronous replication in which data replication from a primary volume to be a replication source to a secondary volume to be a replication destination is asynchronously performed. Moreover, the replication processing may be processing of performing volume replication between different storage apparatuses 1000, besides replication between the volumes in the same storage apparatus 1000.

FIG. 15 shows an example of the replication pair management table 5400 in the storage apparatus A. The replication pair management table 5400 includes a pair ID 5410 being an identifier given to a pair of primary and secondary volumes that form a volume replication pair, a DEV ID 5420 of the primary volume to be a replication source and a DEV ID 5430 of the secondary volume to be a replication destination. For example, FIG. 15 shows that a replication destination of the primary volume VVol1 is VVol2. In addition, other information such as information on a replication processing type such as the synchronous replication and the asynchronous replication may be described in the replication pair management table 5400.

Next, an inter-storage apparatus path table 5500 will be described. FIG. 16 shows an example of an inter-storage apparatus path table 5500 in the storage apparatus B.

The storage apparatus 1000 includes the inter-storage apparatus path table 5500 in the memory 1200. The inter-storage apparatus path table 5500 stores an association relationship between the communication ports 1020 for transmitting and receiving data between the storage apparatuses 1000. The inter-storage apparatus path table 5500 includes a connection source WWN 5510, a connection destination storage apparatus 5520 and a connection destination WWN 5530.

The connection source WWN 5510 is an identifier given to the communication port 1020 of the storage apparatus 1000 (the storage apparatus B in Example 1) being the connection source. The connection destination storage apparatus 5520 is an identifier of the storage apparatus 1000 (the storage apparatus A in Example 1) that is the connection destination. The connection destination WWN 5530 is an identifier given to the communication port 1020 of the storage apparatus 1000 (the storage apparatus A in Example 1) being the connection destination.

The example of FIG. 16 shows that the communication port 1020 of the storage apparatus B, to which "WWN4" is given, and the communication port 1020 of the storage apparatus A, to which "WWN3" is given, are connected to each other.

Note that, in Example 1, the inter-storage apparatus path table 5500 is created after the two storage apparatuses 1000 (the storage apparatuses A and B) are physically connected to each other and connection setting is finished by use of a general storage system management program. Moreover, the created inter-storage apparatus path table 5500 (FIG. 16) is included in the storage apparatus B as shown in FIG. 7.

Note that, when the storage apparatus B has a function of automatically checking communication ports 1020 of other storage apparatuses 1000 connected to the storage apparatus B, and of automatically creating the inter-storage apparatus path table 5500, the storage apparatus B may create the inter-storage apparatus path table 5500 by using this function.

Next, an external connection processing part 4500 shown in FIG. 7 will be described. The memory 1200 of the storage apparatus B in Example 1 includes the external connection processing part 4500. The external connection processing part 4500 manages an external Vol map table 5600 (FIG. 17) to be described later.

The external connection processing part 4500 externally connects a LDEV 1420 of another storage apparatus (the storage apparatus A in Example 1) and integrates the LDEV 1420 as a virtual LDEV (hereinafter called "ExVol 1425", of which details will be described with reference to FIG. 20 to be mentioned later) of the storage apparatus B. The storage apparatus B can provide the integrated ExVol 1425 to the host computer 3000 in the same manner as the LDEV 1420 in the storage apparatus B. Note that specific processing to be executed by the external connection processing part 4500 will be described later.

In the external Vol map table 5600, described are items including: a DEV ID 5610 being an identifier given to a volume in another storage apparatus 1000 to be externally connected; a connection destination WWN 5620 given to the communication port 1020 associated with the volume; a connection destination LUN 5630 being an identifier given to a volume connected to the communication port; and a connection destination DEV ID 5640 being an identifier given to the LDEV 1420 forming the volume.

For example, as shown in FIG. 16, when the communication port 1020 of the storage apparatus B, to which "WWN4" is given, and the communication port 1020 of the storage apparatus A, to which "WWN3" is given, are connected to each other, and when the LDEV 1420 is associated, as a LU 1450 provided with a LUN, with the communication port 1020 provided with "WWN3", the external connection processing part 4500 of the storage apparatus B gives a DEV ID to be utilized within the storage apparatus B to the LDEV 1420 of the storage apparatus A associated with the LU 1450. Thus, the storage apparatus B can handle the LDEV 1420 in the externally connected storage apparatus A as the ExVol 1425 in the storage apparatus B. Note that, in the processing of this example, it is only necessary to find out an association relationship between the connection destination DEV ID 5640 and the DEV ID 5610 given to the externally connected volume. The connection destination WWN 5620 and the connection destination LUN 5630 are described in response to a request in terms of implementation of the storage system 1 of this example.

Note that details of the external Vol map table 5600 will be described with reference to a flowchart to be described later.

In addition, the memory 1200 of the storage apparatus A includes a configuration information communication part 4400. Moreover, the memory 1200 of the storage apparatus B includes a Pool merge processing part 4600. Functions of the Pool merge processing part 4600 and processing to be executed thereby will be described later.

Upon request from the outside, the configuration information communication part 4400 transmits, to the outside, a table storing configuration information in the storage apparatus 1000. The configuration information communication part 4400 also has a function of receiving a table storing configuration information from the outside, and of changing a configuration inside the storage apparatus 1000 according to the received table. The configuration information includes information such as a disk type of the physical disk 1400 forming the LDEV 1420 and a RAID level.

Note that data included in the table of configuration information may be transmitted and received through the management IF 1010, or may be transmitted and received through the communication port 1020.

Figure 18:
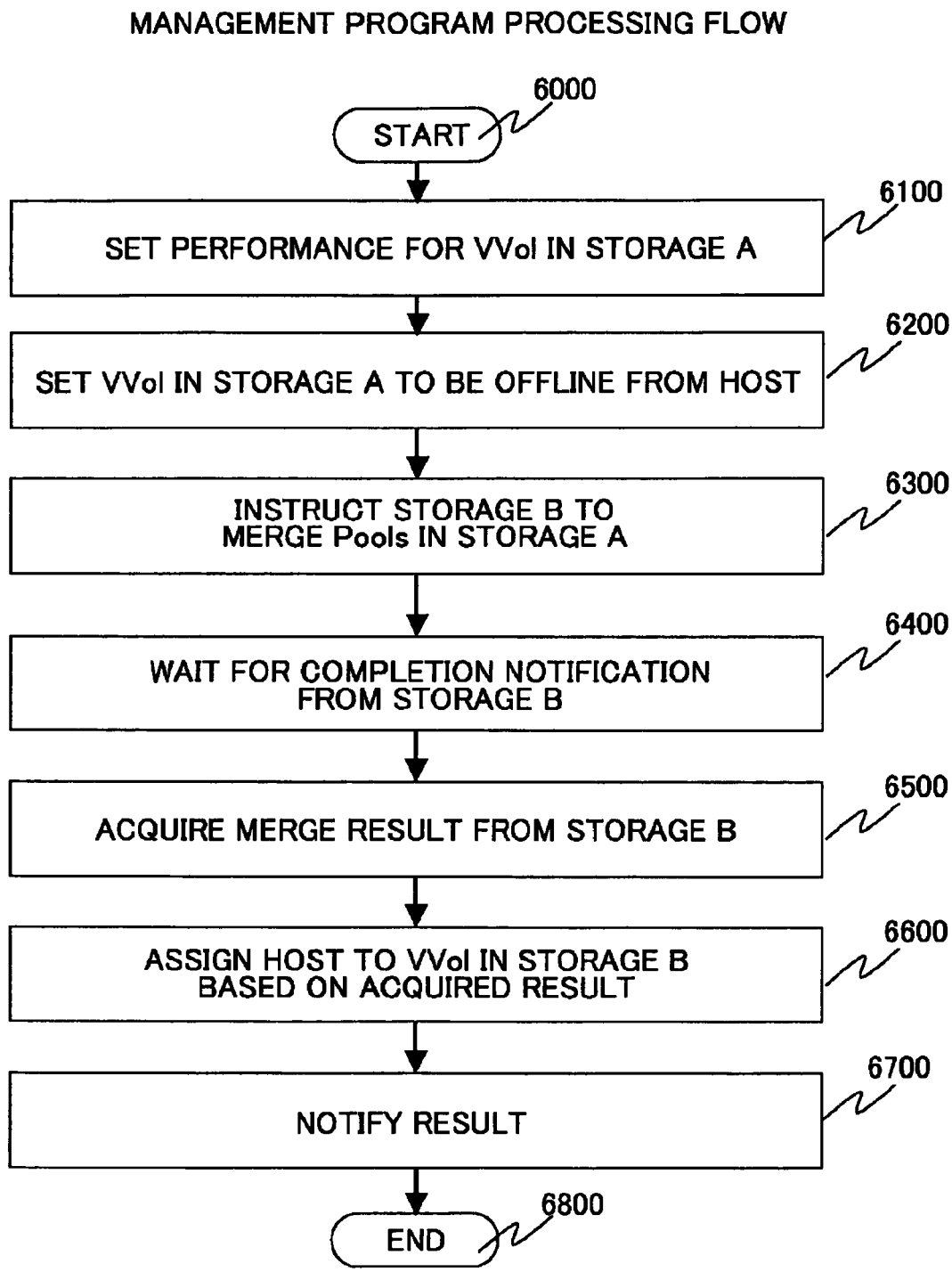
FIG. 18 is a diagram showing an example of a processing flow of a management program 2400 according to Example 1 of the present invention.
Figure 19:
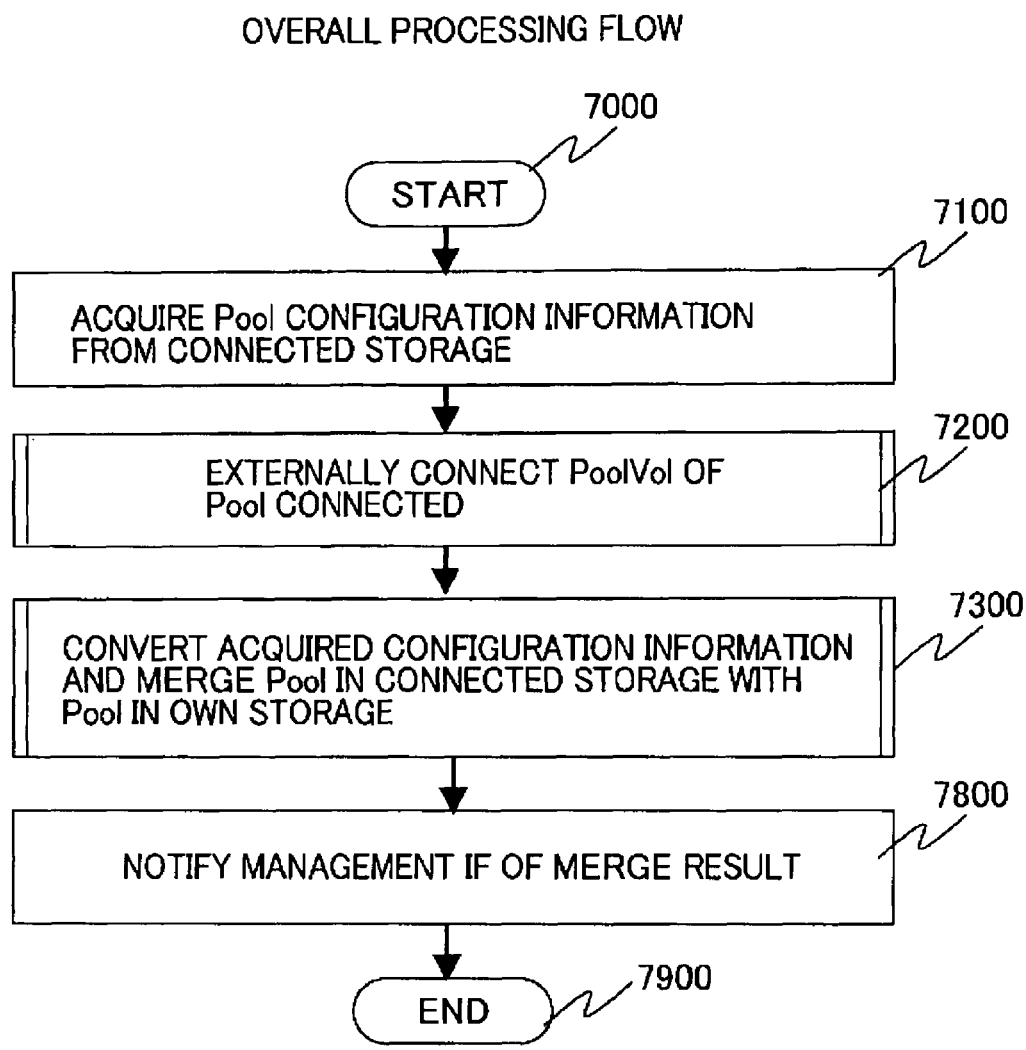
FIG. 19 is a diagram showing an example of an overall processing flow of a pool merge processing part 4600.
Figure 20:
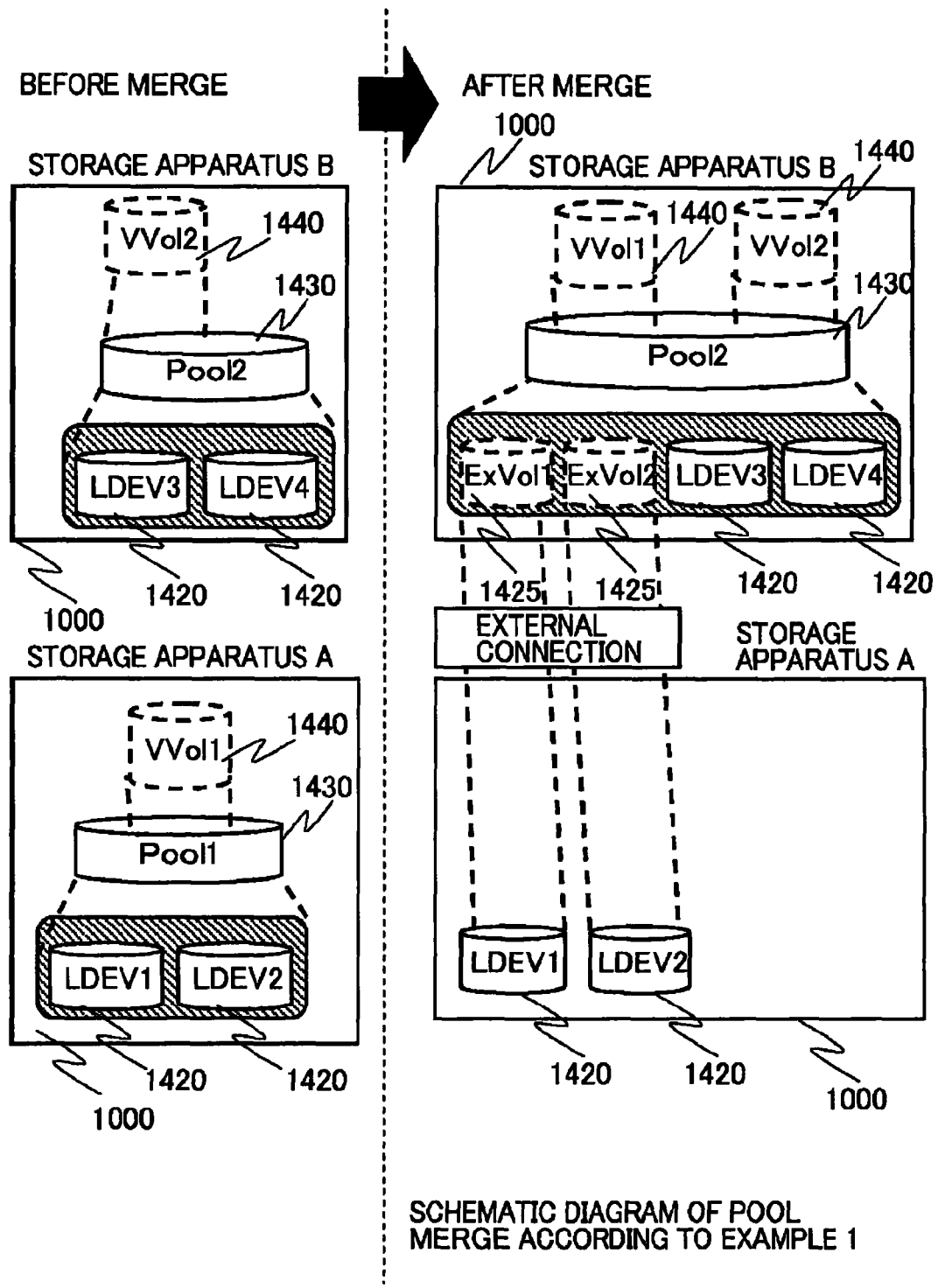
FIG. 20 is a schematic diagram of pool merge processing according to Example 1.

With reference to FIGS. 18 to 20, description will be given below of an outline of processing in the storage system 1 of Example 1.

First, FIG. 18 shows a processing flow 6000 executed when a management program 2400 instructs the Pool merge processing part 4600 in the storage apparatus B to perform Pool merge. Note that the processing flow 6000 of the management program 2400 shown in FIG. 18 is for explaining a schematic flow of the overall processing, and the present invention is not limited to this processing flow.

In Step 6100, the management program 2400 receives a performance definition for a VVol in the storage apparatus 1000 from an administrator or the like through the input device of the management computer 2000. The performance defined here is set as the performance 5220 in the VVol management table 5200. Note that this performance definition is not an essential process.

Next, in Step 6200, the management program 2400 sets the VVol utilizing the Pool to be merged to be offline from the host computer 3000. For example, in the storage apparatus A shown in FIG. 8, LU mapping of the volume utilized by the host having the connection host WWN 5030 of "h1" is canceled. In this step, specifically, in the LU map table 5000 shown in FIG. 8, the LUN 5040 associated with the connection host WWN "h1" is deleted.

Next, in Step 6300, the management program 2400 issues a Pool merge instruction to the storage apparatus (the storage apparatus B in Example 1) which has a merge destination Pool. Detailed processing on the storage apparatus 1000 side will be described with reference to FIG. 19 and the like. Moreover, in this event, the management program 2400 may make an inquiry about specification of a connection method to the administrator or the like through the output device of the management computer. An example of an inquiry screen in this case will be described later in connection with a screen 8000 shown in FIG. 29.

Thereafter, in Step 6400, the management program 2400 waits until Pool merge is completed on the storage apparatus side. Alternatively, the management program 2400 may make an inquiry to the storage apparatus 1000 that has regularly issued instructions to detect completion of the Pool merge.

In Step 6500, a result of the Pool merge is acquired. Thereafter, in Step 6600, the VVol after merge is assigned to the host computer 3000 that has been set offline in Step 6200. This step makes it possible for the host computer 3000 to utilize the VVol after connection as a storage area.

Subsequently, in Step 6700, the result of the Pool merge is notified to the administrator or the like. Thereafter, the processing is terminated. An example of a method for notifying the result will be described later in connection with a screen 8100 shown in FIG. 30.

Next, FIG. 19 shows processing performed by the Pool merge processing part 4600 in the storage apparatus (the storage apparatus B in Example 1) that has been subjected to the Pool merge by the management program 2400.

Upon receipt of the Pool merge instruction from the management program 2400 in Step 7000, the Pool merge processing part 4600 acquires, as configuration information, the PoolVol management table 5100, the VVol management table 5200 and the segment management table 5300 (these three tables will be hereinafter referred to as Pool configuration information) from the storage apparatus (the storage apparatus A in Example 1) connected thereto, in Step 7100. Note that the acquired Pool configuration information is temporarily stored in the memory 1200 during the processing executed by the Pool merge processing part 4600.

In Step 7200, the Pool merge processing part 4600 specifies a PoolVol forming the Pool from the PoolVol management table 5100 and the like, and externally connects the PoolVol to its own storage apparatus as an ExVol. This step will be described in detail with reference to FIG. 21.

Next, in Step 7300, the Pool in the connected storage apparatus is connected with the Pool in the own storage apparatus by converting the acquired Pool configuration information. This step will be described in detail with reference to FIGS. 22 and 23.

Thereafter, in Step 7400, completion of the Pool merge is notified to the management program 2400 through the management IF 1010. Subsequently, the processing is terminated.

FIG. 19 shows an outline of a processing flow executed by the Pool merge processing part 4600. Moreover, FIG. 20 is a schematic diagram showing a change in a volume configuration between before and after execution of the processing shown in FIG. 19.

FIG. 20 indicates a state "before merge", which is before execution of the processing flow shown in FIG. 19. Here, the storage apparatus A has Pool1 including LDEV1 and LDEV2 as PoolVol and VVol1 that is the VVol using Pool1. Also the storage apparatus B having Pool2 including LDEV3 and LDEV4 as PoolVol and VVol2 that is the VVol using Pool2.

With reference to FIG. 19, first, the Pool merge processing part 4600 included in the storage apparatus B acquires Pool configuration information from the storage apparatus A in Step 7100. To be more specific, the Pool merge processing part 4600 communicates with the configuration information communication part 4400 in the storage apparatus A through the management IF 1010 and acquires data described in the PoolVol management table 5100 from the storage apparatus A.

Next, the Pool merge processing part 4600 performs external connection processing in Step 7200 to externally connect LDEV1 to ExVol1 and LDEV2 to ExVol2 as ExVols 1425 as shown in FIG. 20.

Thereafter, the Pool merge processing part 4600 constructs Pool2 including ExVol1 and ExVol2 by converting the acquired Pool configuration information in Step 7300, thereby making it possible to utilize VVol1, which has been the VVol 1440 in the storage apparatus A before the processing, as VVol1 in the storage apparatus B.

As a result of the processing described above, Pool1 in the storage apparatus A is merged with Pool2 in the storage apparatus B, and VVol1 in the storage apparatus A can be utilized as VVol1 in the storage apparatus B.

Figure 21:
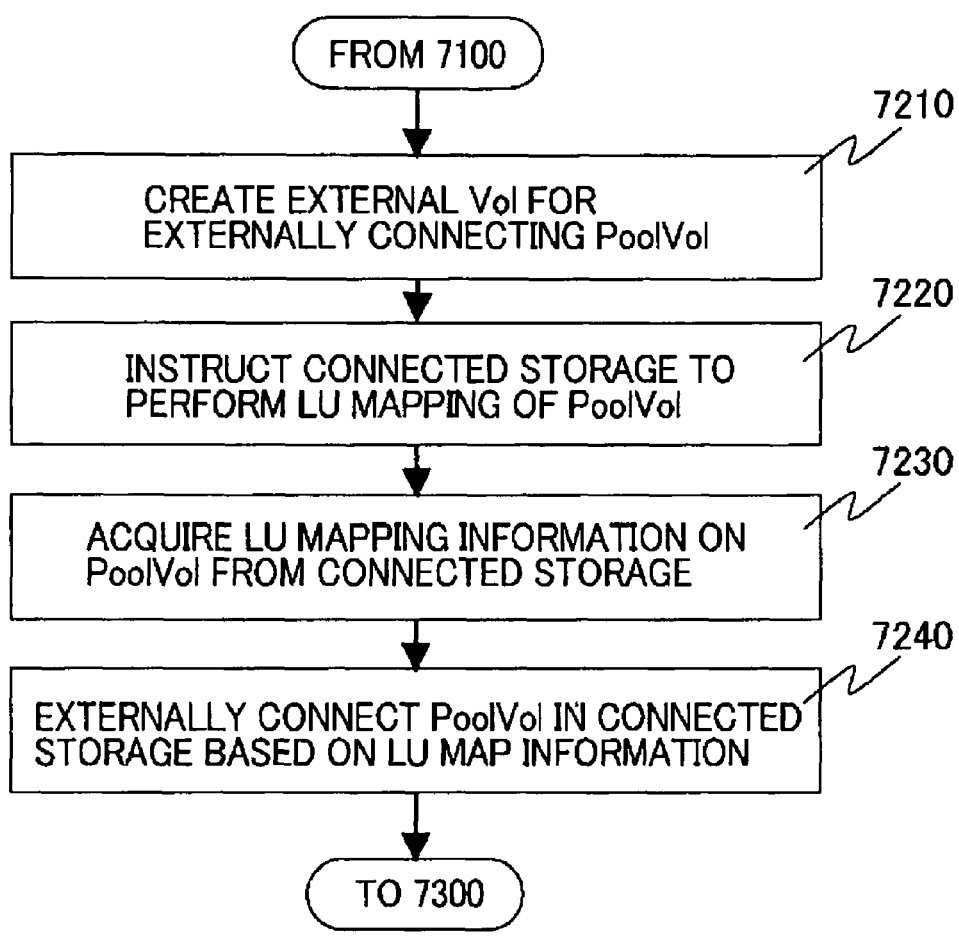
FIG. 21 is a diagram showing an example of a processing flow of an external processing unit 4500.

Next, Step 7200 shown in FIG. 19 will be described in detail with reference to FIG. 21.

In Step 7210, the Pool merge processing part 4600 in the storage apparatus B creates ExVols 1425, which is externally connected virtual LDEVs, in the number corresponding to the number of PoolVols on the basis of the PoolVol management table 5100 in the storage apparatus A acquired in Step 7100.

For example, the Pool merge processing part 4600 in the storage apparatus B creates ExVol1, ExVol2, ExVol3 and ExVol4 respectively corresponding to LDEV1 , LDEV2, LDEV3 and LDEV4, which are PoolVols in the storage apparatus A.

In Step 7220, the Pool merge processing part 4600 refers to the inter-storage apparatus path table 5500 in its own storage apparatus B, and instructs the LU map processing part 4000 in the storage apparatus A as the connection destination to perform LU mapping of the PoolVol onto the connection destination WWN 5530. For example, the Pool merge processing part 4600 in the storage apparatus B instructs LU mapping of the PoolVol onto the connection destination WWN 5530 of the storage apparatus A.

Thus, the LU map processing part 4000 in the storage apparatus A updates the LU map table 5000 shown in FIG. 8 to a LU map table 5000 shown in FIG. 24. In FIG. 24, for example, LDEV1 that has been PoolVol is LU-mapped to LUN1 of WWN3.

In Step 7230, the Pool merge processing part 4600 acquires the updated LU map table 5000 in the storage apparatus A as the connection destination. For example, the Pool merge processing part 4600 in the storage apparatus B acquires the updated LU map table 5000 (FIG. 24) in the storage apparatus A.

Figure 17:
FIG. 17 is a table showing an example of an external Vol map table 5600 in the storage apparatus B (1000).

Next, the Pool merge processing part 4600 instructs the external connection processing part 4500 to externally connect the PoolVols in the storage apparatus A as the connection destination, the PoolVols being mapped onto the connection destination WWN 5530 in Step 7220, to the ExVols 1425 created in Step 7210. The external connection processing part 4500 that has received the instruction performs external connection processing for the PoolVols to create an external Vol map table 5600. For example, the Pool merge processing part 4600 in the storage apparatus B, which has acquired the LU map table 5000 shown in FIG. 24, identifies that the PoolVols in the storage apparatus A are LU-mapped to LUN1, LUN2, LUN3 and LUN4 of WWN3. Thereafter, the Pool merge processing part 4600 instructs the external connection processing part 4500 in the storage apparatus B to externally connect LUN1 to LUN4 of "WWN3" that is the connection destination WWN 5620 to ExVol1 to ExVol4 created in Step 7210. Thus, the external Vol map table 5600 shown in FIG. 17 is generated.

Note that the Pool merge processing part 4600 in the storage apparatus B may instruct the storage apparatus A to delete the Pool and VVol after executing the processing up to Step 7240 to complete the external connection of the PoolVols in the storage apparatus A. In this case, specifically, description related to Pool1 is deleted from the PoolVol management table 5100 and the segment management table 5300 in the storage apparatus A. Furthermore, in this event, if there occurs data write from the host computer 3000 into the PoolVol in the storage apparatus A, this data write is inhibited.

Next, the Pool merge processing 7300 in FIG. 19 will be described in more detail with reference to FIGS. 22 and 23.

First, in Step 7310, the Pool merge processing part 4600 in the storage apparatus B replaces the DEV ID 5110 in the PoolVol management table 5100 and the DEV ID 5330 in the segment management table 5300 among the Pool configuration information acquired in Step 7100 from the connection destination DEV ID 5640 to the DEV ID 5610 by use of the relationship in the external Vol map table 5600. Moreover, the RAID group ID 5150 in the acquired PoolVol management table 5100 is rewritten into a RAID group ID indicating external connection.

For example, the Pool merge processing part 4600 in the storage apparatus B replaces LDEV1 described in the DEV ID 5110 in the PoolVol management table 5100 (FIG. 9) with "ExVol1" and LDEV1 recorded in the DEV ID 5330 in the segment management table 5300 (FIG. 11) with "ExVol1", respectively, by use of the relationship that LDEV1 is set to be "ExVol1" as the ExVol in the external Vol map table 5600 among the Pool configuration information acquired from the storage apparatus A. Moreover, the Pool merge processing part 4600 rewrites the RAID group ID 5150 in the PoolVol management table 5100 into "Ex1-1" or the like indicating an external volume ExVol. The Pool merge processing part 4600 in the storage apparatus B performs the same operation for LDEV2, LDEV3 and LDEV4 which have been the PoolVols in the storage apparatus A.

Next, in Step 7320, the Pool merge processing part 4600 in the storage apparatus B replaces the Pool ID 5120 in the PoolVol management table 5100, the Pool ID 5250 in the VVol management table 5200 and the Pool ID 5310 in the segment management table 5300 among the Pool configuration information acquired in Step 7100 with the Pool ID of the Pool to be a merge destination.

For example, in the case of merging the Pool in the storage apparatus A with the Pool having the Pool ID of Pool1 in the storage apparatus B, the Pool merge processing part 4600 in the storage apparatus B sets all of the Pool ID 5120 in the PoolVol management table 5100 (FIG. 9), the Pool ID 5250 in the VVol management table 5200 (FIG. 13) and the Pool ID 5310 in the segment management table 5300 (FIG. 11), among the Pool configuration information acquired from the storage apparatus A, to be Pool1.

Next, in Step 7330, the Pool merge processing part 4600 rewrites the VVol ID 5210 in the VVol management table 5200 and the VVol ID 5360 in the segment management table 5300 among the Pool configuration information acquired in Step 7100 into the VVol ID that does not overlap with the VVol ID of the Pool as the merge destination.

For example, there is the VVol with the VVol ID of "VVol1" utilizing the Pool1 in the storage apparatus B. Therefore, the Pool merge processing part 4600 in the storage apparatus B rewrites the VVol having the VVol ID 5210 of VVol1 in the VVol management table 5200 (FIG. 13), among the acquired Pool configuration information, into "VVol2," and further rewrites VVol2 that overlaps as a result of the rewrite into "VVol3." Similarly, the Pool merge processing part 4600 rewrites the VVol having the VVol ID 5360 of VVol1 in the segment management table 5300 (FIG. 11) into "VVol2," and further rewrites VVol2 that overlaps as a result of the rewrite into "VVol3." Note that the rewrite method described here is just an example, and any rewrite method may be adopted as long as a state where no VVol IDs overlap with each other can be achieved in the Pool in the storage apparatus B after merge.

Next, in Step 7340, the Pool merge processing part 4600 rewrites the segment ID 5260 in the VVol management table 5200 and the segment ID 5320 in the segment management table 5300 among the Pool configuration information acquired in Step 7100 into the segment ID that does not overlap with the segment ID of the Pool as the merge destination.

For example, when there are consecutive segment IDs 001 to 200 which utilize the Pool1 in the storage apparatus B, the Pool merge processing part 4600 in the storage apparatus B replaces the segment ID 5320 in the segment management table 5300 (FIG. 11), among the acquired Pool configuration information, in the following manner. Specifically, the segment ID 001 having the Pool ID of Pool1 in the storage apparatus A is replaced with 201 and the segment ID 002 is replaced with 202 and so on. Moreover, rewrite is continued so as not to cause overlaps in such a manner that the segment ID 001 having the Pool ID of Pool2 in the storage apparatus A is replaced with 401 and so on. Furthermore, the segment ID 5260 in the VVol management table 5200 (FIG. 13) is rewritten in the following manner so as to correspond to the rewrite in the segment management table 5300. Specifically, the segment ID having the Pool ID of Pool1 in the storage apparatus A is rewritten from 001 to 201 and so on. Note that the rewrite method is just an example. Any rewrite method may be adopted as long as no segment IDs overlap in the Pool in the storage apparatus B after merge, and the association relationship between the segment ID 5260 in the segment management table 5300 and the segment ID 5260 in the VVol management table 5200 is maintained after the rewrite.

Next, in Step 7350, the Pool merge processing part 4600 acquires a replication pair management table 5400 in the storage apparatus A as the merge destination. In Step 7360, the Pool merge processing part 4600 checks if there is a replication pair between VVols in the Pool as a target of Pool merge. If there is the replication pair between the VVols, the Pool merge processing part 4600 performs Step 7370 and then advances to Step 7380. On the other hand, if there is no replication pair between the VVols, the Pool merge processing part 4600 advances to Step 7380 without performing Step 7370. Note that Steps 7350 to 7370 may be executed only when there is an instruction from the outside.

For example, the Pool merge processing part 4600 in the storage apparatus B acquires the replication pair management table 5400 (FIG. 15) from the configuration information communication part 4400 in the storage apparatus A through the management IF 1010. Thereafter, the Pool merge processing part 4600 refers to the acquired replication pair management table 5400 and checks if there is a replication pair between the VVols. In the case of Example 1, since there is a replication pair between the VVol1 utilizing the storage Pool1 and the VVol2 utilizing the Pool2, the Pool merge processing part 4600 advances to Step 7370.

In Step 7370, the Pool merge processing part 4600 adds a VVol ID of a VVol to be a pair partner to the assignment prohibition VVol ID 5160 in the PoolVol management table 5100 for the PoolVols forming the Pool utilized by each VVol from the acquired replication pair management table 5400. Furthermore, the Pool merge processing part 4600 executes the rewrite of the VVol ID in Step 7330 for the assignment prohibition VVol ID 5160.

For example, as shown in FIG. 15, if there is a replication pair relationship between VVol1 and VVol2 in the storage apparatus A, the Pool merge processing part 4600 in the storage apparatus B adds VVol2 to the assignment prohibition VVol ID 5160 for the PoolVol (LDEV1 and LDEV2) in the Pool utilized by VVol1 in the PoolVol management table 5100 (FIG. 9) in the storage apparatus A. Meanwhile, VVol1 is added to the assignment prohibition VVol ID 5160 for the PoolVol (LDEV3 and LDEV4) in the Pool2 utilized by VVol2. Furthermore, based on the rewrite relationship of the VVol ID used in Step 7330, VVol1 is rewritten into VVol2 and VVol2 is rewritten into VVol3. Accordingly, in the Pool after merge in the storage apparatus B, it is guaranteed that no segments are assigned to both of VVol1 and VVol2 (VVol2 and VVol3 after merge) in a replication relationship in the storage apparatus A from the same LDEV or ExVol. Thus, data in the both volumes set in the replication pair relationship is prevented from being inaccessible during PoolVol failures.

Note that, in the case of performing Step 7370, when a segment is assigned to one of the VVols in the replication relationship, the segment processing part 4200 in the storage apparatus B has a function of adding a VVol ID of a replication destination to the assignment prohibition VVol ID 5160 of the LDEV including the assigned segment in the PoolVol management table 5100, and of inhibiting assignment of a segment to the added VVol ID.

Next, in Step 7380, the Pool merge processing part 4600 checks if there is, among the VVols in the connected storage apparatus, a VVol having a performance set to "high" in the VVol management table 5200 acquired from the storage apparatus A as the connection destination. If there is no VVol having the performance set to "high", the Pool merge processing part 4600 advances to Step 7410. On the other hand, if there is such a VVol, the Pool merge processing part 4600 advances to Step 7390. Note that Steps 7380, 7390 and 7400 may be executed only when there is an instruction from the outside.

In Step 7390, if there is the VVol having the performance set to "high" in the acquired VVol management table 5200, the Pool merge processing part 4600 specifies a segment assigned to the VVol having the performance set to "high" from the VVol management table 5200. Thereafter, data stored in the specified segment is copied to a segment that is not assigned from ExVol that is an external Vol to the VVol in the LDEV 1420 of the merge destination.

Subsequently, in Step 7400, the Pool merge processing part 4600 rewrites the segment ID 5260 in the VVol management table 5200 among the Pool configuration information acquired in Step 7100 so as to utilize the segment copied to the LDEV 1420 of the merge destination. Moreover, among the VVol IDs 5360 in the segment management table 5300 acquired in Step 7100, the VVol ID of the segment serving as the replication source is described "NULL," thereby making it possible to assign the segment to another VVol.

For example, in Step 7380, the Pool merge processing part 4600 in the storage apparatus B refers to the VVol management table 5200 shown in FIG. 13 and acquired in Step 7100, and identifies that the performance of the VVol2 (VVol3 after the rewrite in Step 7330) is set to "high" in the storage apparatus A. Thereafter, in Step 7390, the Pool merge processing part 4600 copies data stored in the segment ID 101 (segment ID 501 after the rewrite in Step 7340) which is assigned to the VVol, for example, to the segment having the segment ID of 101 as one of the segments of LDEV6 that is the PoolVol in the storage apparatus B. Finally, in Step 7400, the segment ID "501" after the rewrite in Step 7340 in the VVol management table 5200 (FIG. 13) is set to be the segment ID "101", thereby assigning the segment of LDEV6 that is the LDEV in the storage apparatus B. Moreover, in the segment management table 5300, the VVol ID 5360 of the segment having the segment ID "501" after the rewrite in Step 7340 is set to be "NULL".

Note that, when the performance is set in the VVol management table 5200, the segment processing part 4200 in the storage apparatus B sets a segment from the LDEV 1420 created from a high-speed disk 1400 in the storage apparatus B to be assigned to the VVol having the performance set to "high" as much as possible. Moreover, when high reliability is required as the performance, the segment may be assigned preferentially from the LDEV 1420 in the storage apparatus B.

Next, in Step 7410, the Pool merge processing part 4600 of storage apparatus B merges the Pool in the storage apparatus A as the merge destination with the Pool in the storage apparatus B based on the Pool configuration information acquired in Step 7100 and rewritten in Steps 7310 to 7400. Note that, upon execution of the Pool merge processing, the segments forming the VVol are rearranged so as to be evenly distributed in all the merged PoolVols. Thus, data IO performance from the host computer 3000 can be improved.

For example, FIGS. 25 to 27 show the PoolVol management table 5100, the VVol management table 5200 and the segment management table 5300, respectively, which are the Pool configuration information in the storage apparatus B after the Pool in the storage apparatus A is merged with the Pool having the Pool ID of Pool1 in the storage apparatus B by executing the processing described above.

In Step 7420, when a replication pair relationship is set between the VVols in the replication pair management table 5400 acquired from the storage apparatus A as the connection destination, the Pool merge processing part 4600 also defines a replication pair between the VVols after merge, and then advances to Step 7800.

Figure 28:
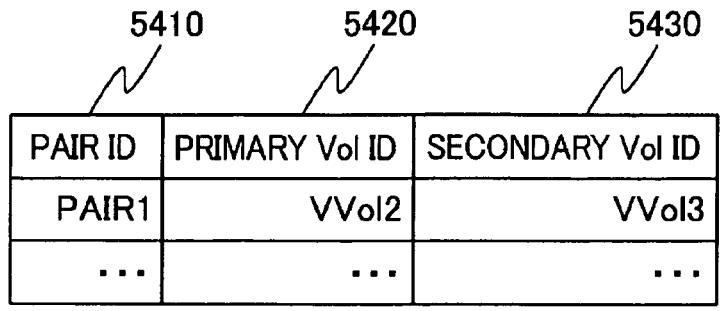
FIG. 28 is a diagram showing an example of a replication pair management table 5400 in the storage apparatus B (1000) after the pool merge processing.

For example, when VVol1 and VVol2 are set as a replication pair in the storage apparatus A, the Pool merge processing part 4600 in the storage apparatus B sets corresponding VVol2 and VVol3 as a replication pair, after execution of Pool merge processing. Thus, a replication pair management table 5400 shown in FIG. 28 is created in the storage apparatus B.

FIG. 29 shows an example of a screen 8000 which can be used when the Pool merge method is outputted to an output device such as a monitor that is the output device in the management computer 2000, for example, in Step 6300 performed by the management program 2400 shown in FIG. 18.

On the screen 8000, provided are: a selection part 8010 for selecting a storage apparatus to be a merge destination; a selection part 8020 for selecting a Pool to be a merge target; a selection part 8030 for selecting a Pool to be selection target when partial merge is selected as the merge target; and a selection part 8040 for specifying so that a segment in the PoolVol in the storage apparatus B of a merge destination is assigned as a segment for creating the VVol when the performance 5220 described in the VVol management table 5200 is "high" (Steps 7380 to 7400).

The selection part 8030 displays, for each Pool to be the merge target, utilization of the Pool, a disk type assigned to the PoolVol, the VVol utilizing the Pool, information on a replication pair (in the example of FIG. 29, a detailed replication pair relationship is displayed by selecting "Detail"), and the like.

Note that the screen 8000 is just an example of the merge method selection screen, and a screen design including information contents to be displayed, a display format and a selection method can be accordingly determined.

Figure 30:
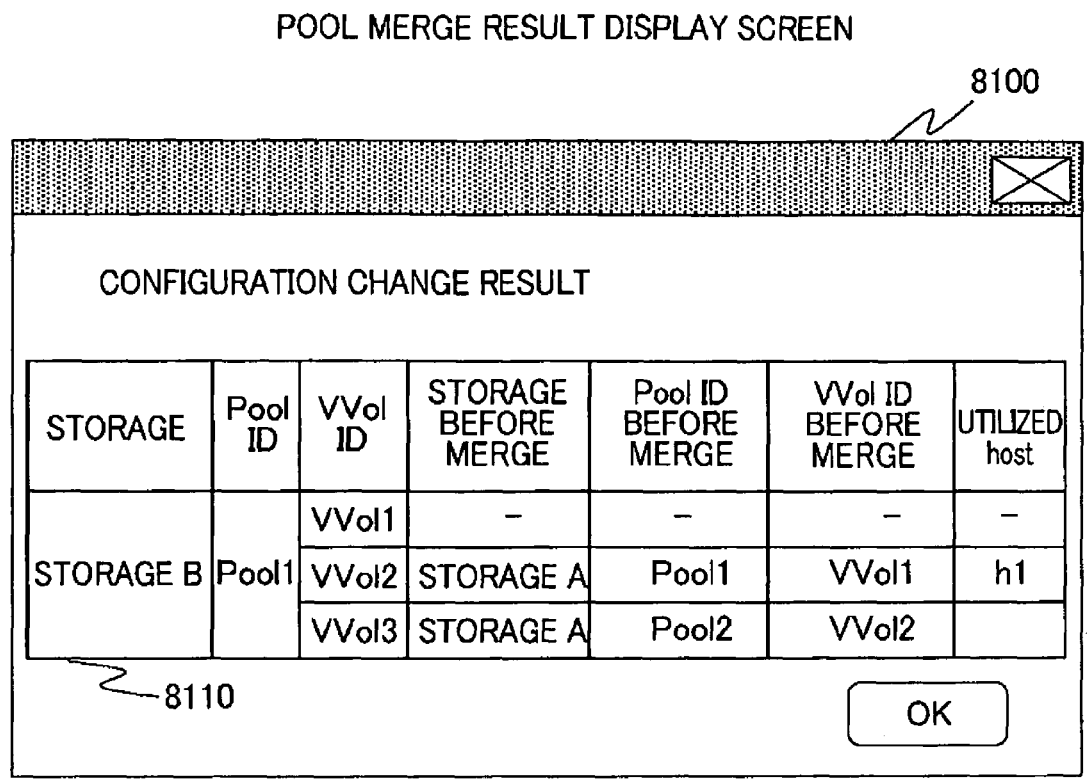
FIG. 30 is an example of a pool merge result display screen outputted by the management computer 2000 of Example 1.

FIG. 30 shows a screen 8100 as an example of a screen for displaying a result of Pool merge processing. The screen 8100 shown in FIG. 30 includes a display part 8110 displaying, as a configuration change result for the storage apparatus B, a Pool ID indicating a Pool set as a merge target, a VVol ID indicating a VVol included in the Pool, a merge source storage apparatus name before merge, a Pool ID before merge, a VVol ID before merge, and a host computer name that has used the corresponding VVol.

Note that the screen 8100 is just an example of the merge result display screen and a screen design including information contents to be displayed and a display format can be accordingly determined.

Example 2

In Example 1, the method for merging Pools belonging to different storage apparatuses has been disclosed. Meanwhile, in Example 2, description will be given of a method for determining a merge destination of a Pool based on attribute information on a PoolVol or a replication pair relationship set between VVols.

First, description will be given of a method for determining a merge destination of a Pool by taking into consideration attribute information on a PoolVol in the Pool to be merged.

Figure 22:
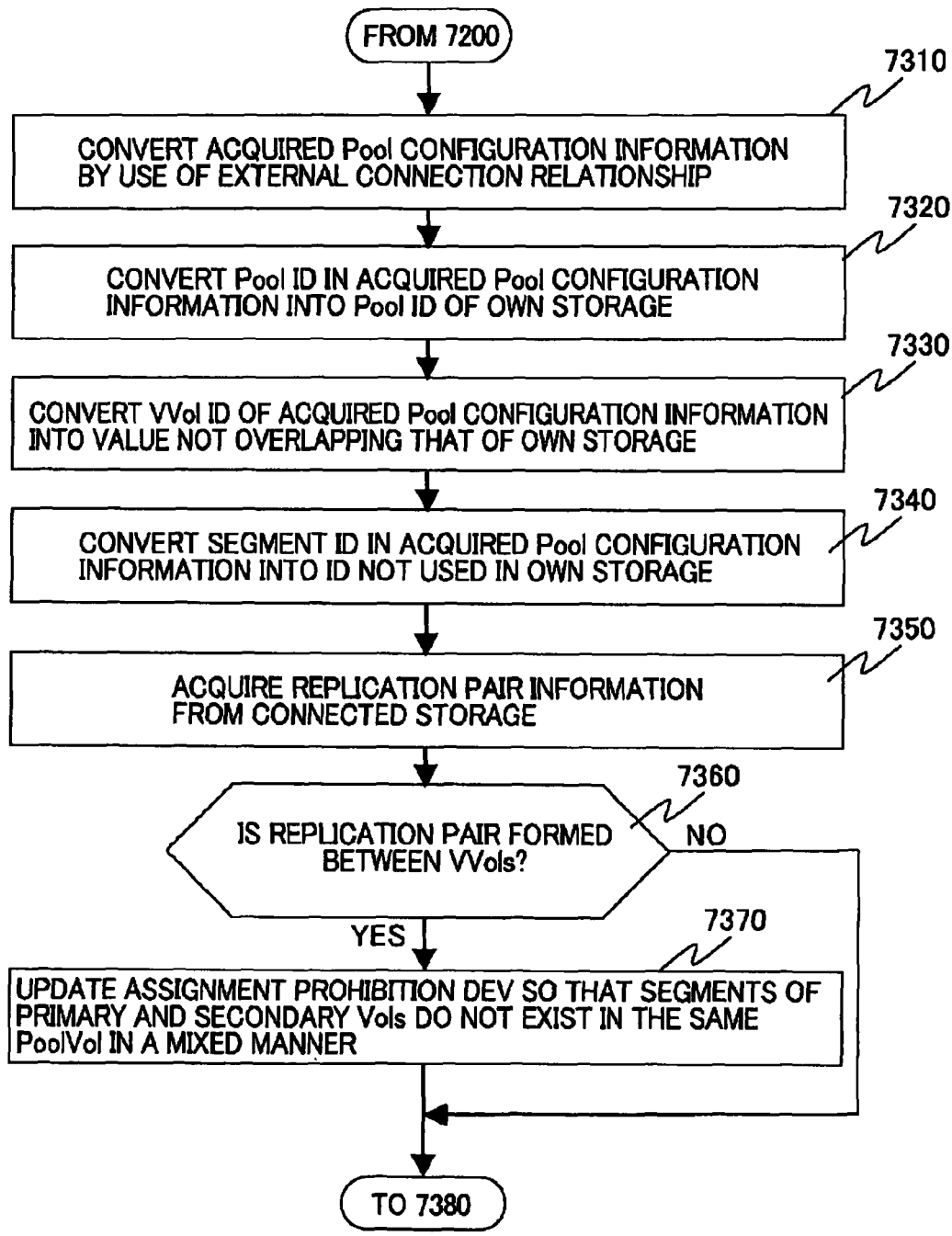
FIG. 22 is a diagram (Part 1) showing a detailed processing flow of the pool merge processing part 4600.
Figure 23:
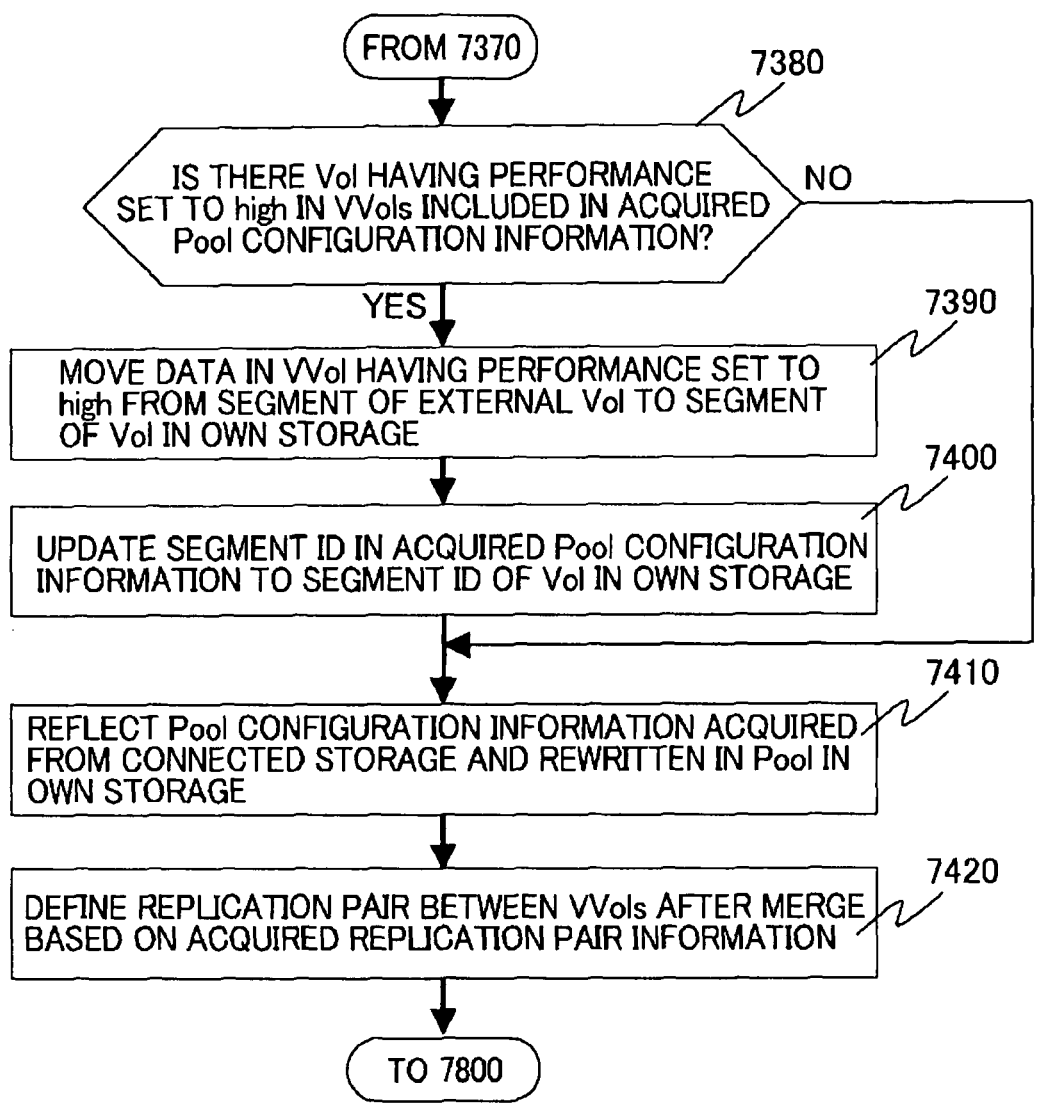
FIG. 23 is a diagram (Part 2) showing a detailed processing flow of the pool merge processing part 4600.
Figure 31:
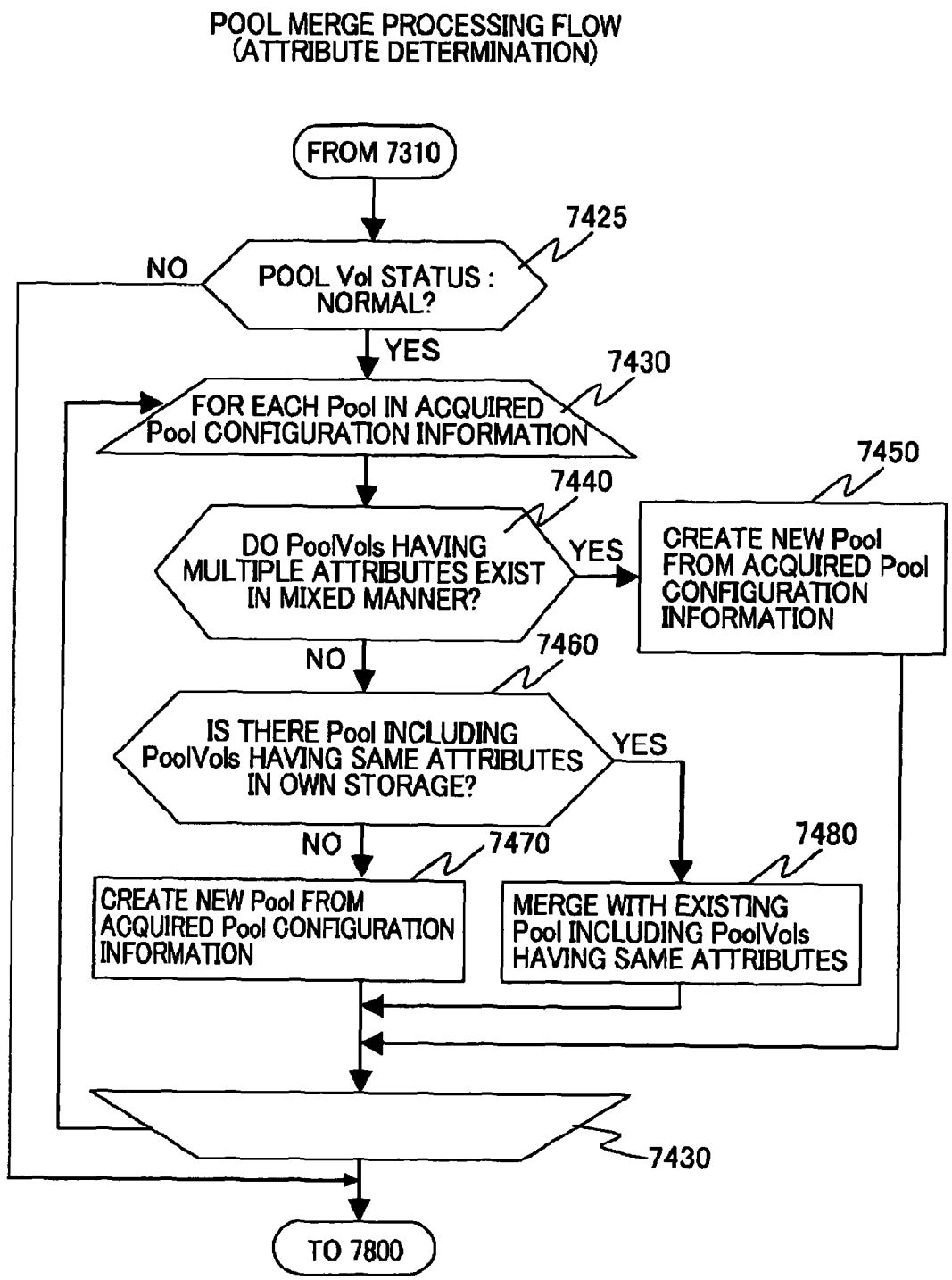
FIG. 31 is a diagram showing an example of a pool merge processing flow in which PoolVol attribute information according to Example 2 of the present invention is taken into consideration.

FIG. 31 shows a processing flow of processing performed after the connection destination PoolVol is externally connected as the ExVol in the processing flow shown in FIG. 22 and the Pool configuration information acquired in Step 7100 shown in FIG. 19 is rewritten by use of the external connection relationship (after Step 7310).

In Step 7430, for each Pool included in the Pool configuration information on the connection destination storage apparatus A, the information being acquired in Step 7100, Steps 7440 to 7480 are executed. For convenience of explanation, it is assumed that the processing is executed for a Pool having a Pool ID of PoolA included in the acquired Pool configuration information.

It is to be noted prior to step 7430 in the process flow in FIG. 31 is provided a process step of deciding if a PoolVol to be merged is normal or not to prevent a merge target pool from being merged with a Pool including a PoolVol with failure while information on a PoolVol status in a column of Vol status 5170 as attribute information is stored and managed. Here, an attribute value for each PoolVol status information will be either "Normal" or "Failure", "Normal" indicating a normal data IO is carried out between the PoolVol and the host computer 3000, and "Failure" indicating the data IO between the PoolVol and the host computer 3000 is unable due to some reason.

If a PoolVol has a failure, it is possible that the host computer 3000 is unable to utilize a Pool including the PoolVol or a VVol derived from the Pool. So as to avoid unavailability of an entire Pool as a result of merge with another Pool including a PoolVol with failure, such a process flow may be employed that step 7425 as shown below is placed prior to step 7430.

In 7425, the PoolVol management table 5100 is examined as to if PoolA in the table 5100 includes a PoolVol having status information indicating the PoolVol accompanies failure. If the PoolA does not include a PoolVol with failure, the processes in step 7440 and the subsequent steps are carried out. If the PoolA includes a PoolVol with failure, the PoolA is determined it is not to be selected as a merge target and the process proceeds to step 7800. In the latter case, information containing the fact that the PoolA includes a PoolVol with failure may be transmitted to a system administrator by means of the management computer 2000 or the like.

Note that Steps 7440 to 7480 may adopt a method in which rewrite processing and the like described below is executed and thus obtained results are reflected not to each Pool, but to the entire Pool configuration information.

In Step 7440, the Pool merge processing part 4600 refers to a portion of the PoolA in the PoolVol management table 5100 acquired in Step 7100, and checks if there is a Pool in which attributes are different between PoolVols of the Pool forming the PoolA, for example, the disk type 5130 or the RAID level 5140 is different. If there are PoolVols having different attributes in the PoolA, the processing advances to Step 7450. On the other hand, if the PoolA is formed of only PoolVols having the same attributes, the processing advances to Step 7460.

In Step 7450 in the case where there are PoolVols having different attributes in the same Pool, the Pool merge processing part 4600 generates a Pool not to be merged with another Pool by reflecting the Pool configuration information acquired in Step 7100 to a storage apparatus having a merge destination Pool, as in the case of Step 7410 where the Pool ID is rewritten into a Pool ID different from others. Alternatively, the Pool merge processing part 4600 may be configured not to merge the Pool that is the PoolA instead of creating a new Pool.

In Step 7460, the Pool merge processing part 4600 determines whether or not all the attributes of the PoolVols in the Pool that is the PoolA are the same. If the attributes are the same, the Pool merge processing part 4600 refers to the Pool configuration information in its own storage apparatus B, and checks if there is a Pool including PoolVols having the same PoolVol attributes. Note that the attribute mentioned here may be one specific attribute (for example, only the disk type 5130) or may be multiple attributes (for example, the disk type 5130 and the RAID level 5140).

If there is a Pool including PoolVols having the same attributes as those of the PoolVols in the Pool that is the PoolA in the storage apparatus B having the Pool merge processing part 4600, Pool configuration information (a portion where the Pool ID is PoolA in the PoolVol management table 5100, the VVol management table 5200 and the segment management table 5300) on the Pool that is the PoolA is rewritten into the Pool ID of the Pool having the same PoolVol attributes in Step 7480. Thereafter, if there are redundant segment IDs and VVol IDs after performing the same operations as Steps 7330 and 7340, those IDs are rewritten so as to eliminate the redundancy. Subsequently, the Pools having the same attribute information are merged with each other by reflecting the rewritten Pool configuration information to the own storage apparatus B.

If it is determined in Step 7460 that there is no Pool including PoolVols having the same attributes as those of the PoolVols in the PoolA, the Pool merge processing part 4600 creates a new Pool based on the Pool configuration information on the PoolA as in the case of Step 7450. Alternatively, the Pool that is the PoolA may be set to be exempt from the merge target.

For example, in Step 7430, the Pool merge processing part 4600 in the storage apparatus B performs Steps 7440 to 7480 for the Pool1 described in the PoolVol management table 5100 in the storage apparatus A shown in FIG. 9 as the PoolA.

In Step 7440, when the disk type 5130 is selected as the attribute regarding the PoolVol in the Pool1, the processing advances to Step 7460 since all the disk types 5130 are the SATA.

In Step 7460, the Pool merge processing part 4600 checks if there is a Pool having the disk type of SATA in the PoolVol in the own storage apparatus B shown in FIG. 10. In the example of FIG. 10, the contents of the PoolVol management table 5100 in the storage apparatus B show that there is no Pool having the disk type of SATA. Accordingly, the Pool merge processing part 4600 changes the Pool ID in the Pool configuration information on the Pool1 in the storage apparatus A from Pool1 to a Pool ID (for example, Pool3) that does not exist in the storage apparatus B, and rewrites the segment and the VVol ID as in the case of Steps 7330 and 7340 in Example 1. Thereafter, the Pool merge processing part 4600 creates a new Pool in the storage apparatus B based on the rewritten Pool configuration information.

Meanwhile, when Pool2 is selected as PoolA in Step 7430, the Pool merge processing part 4600 in the storage apparatus B knows that the disk type 5130 of the PoolVol in the storage apparatus A is FC and the PoolVol in the Pool1 having the disk type 5130 of FC also exists in the storage apparatus B, in Step 7460.

In this case, the Pool merge processing part 4600 rewrites the Pool ID in the Pool configuration information, that is Pool2 in the storage apparatus A, into Pool1. Furthermore, the Pool merge processing part 4600 rewrites the segment and the VVol ID as in the case of Steps 7330 and 7340 in Example 1, and reflects the rewritten Pool configuration information to the Pool configuration information in the storage apparatus B. Thus, the Pool that is Pool1 in the storage apparatus A and the Pool that is Pool1 in the storage apparatus B are merged with each other.

The processing flow of FIG. 31 described above makes it possible to create a Pool formed of PoolVols having the similar performance including a data transfer rate. Therefore, suitable Pools can be merged according to the use of the Pool of the merge source, such as a Pool for VVol required to have high performance in terms of data IO and a Pool for VVol required to have high reliability for the purpose of data storage.

Figure 32:
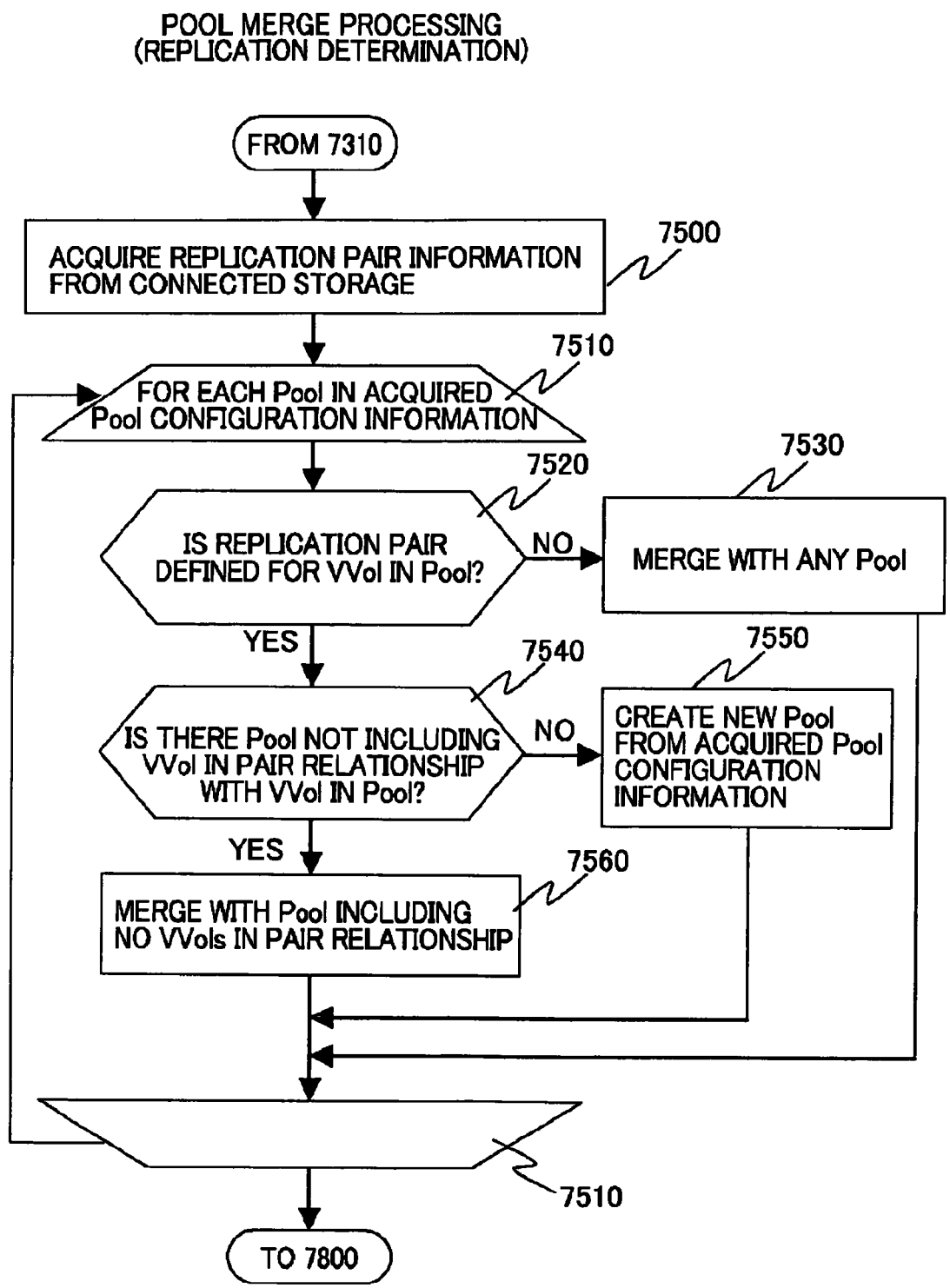
FIG. 32 is a diagram showing an example of pool merge processing in which a VVol replication pair relationship according to Example 2 of the present invention is taken into consideration.

Next, with reference to FIG. 32, description will be given of a method for determining whether or not Pools can be merged based on a replication pair relationship between VVols utilizing the Pool. FIG. 32 shows an example of a processing flow of this method.

In this example, description will be given of processing performed after the connection destination PoolVol is externally connected as the ExVol, and the Pool configuration information acquired in Step 7100 is rewritten by use of the external connection relationship in the processing flow shown in FIG. 22.

In Step 7500, the Pool merge processing part 4600 in the storage apparatus B acquires the replication pair management table 5400 from the storage apparatus A as in the case of Step 7350.

For example, the Pool merge processing part 4600 in the storage apparatus B acquires the replication pair management table 5400 (FIG. 15) from the storage apparatus A.

In Step 7510, for each Pool included in the Pool configuration information acquired in Step 7100, the Pool merge processing part 4600 performs Steps 7520 to 7560. For convenience of explanation, it is assumed that the processing is executed for a Pool having a Pool ID of PoolA in the Pool configuration information. Note that it is also possible to adopt a method in which rewrite processing and the like described below are executed and thus obtained results are reflected not to each Pool, but to the entire Pool configuration information.

First, in Step 7520, the Pool merge processing part 4600 checks if there is a VVol in a pair relationship with a VVol utilizing the Pool that is PoolA in the acquired replication pair management table 5400. If it is determined that there is no VVol in the pair relationship, the PoolA is merged with an arbitrary Pool in the storage apparatus B in Step 7530 as in the case of Steps 7320 and thereafter described in Example 1.

If it is determined that there is a replication pair between the VVols, the Pool merge processing part 4600 advances to Step 7540 to perform processing for merging Pools so as not to merged Pools utilized by the VVols in the replication pair relationship.

In Step 7540, the Pool merge processing part 4600 checks if there is, in the storage apparatus B, a Pool including no VVol having the replication pair relationship with the VVol utilizing the Pool that is PoolA. If it is determined that there is the Pool including no VVol having the replication pair relationship, the Pool merge processing part 4600 advances to Step 7560 to merge the PoolA in the storage apparatus A with the Pool in the storage apparatus B.

If it is determined that there is only the Pool including the VVol having the replication pair relationship, the Pool merge processing part 4600 creates, in Step 7550, a new Pool in the own storage apparatus B based on the Pool configuration information on the Pool that is the PoolA. Alternatively, the Pool merge processing part 4600 may be configured not to perform any processing in Step 7550.

For example, when there is no replication pair relationship between the VVol utilizing the Pool1 in the storage apparatus A and the VVol utilizing the Pool1 in the storage apparatus B in the storage apparatuses A and B having the Pool configuration information shown in FIGS. 9 to 14, the Pool1 in the storage apparatus A is merged with the Pool1 in the storage apparatus B.

When the VVol1 utilizing the Pool1 in the storage apparatus A is in the replication pair relationship with the VVol1 utilizing the Pool1 in the storage apparatus B, the Pool1 in the storage apparatus A is merged with a Pool other than the Pool1 in the storage apparatus B. Alternatively, a new Pool is created in the storage apparatus B based on the Pool configuration information that is the Pool1 in the storage apparatus A, or the Pool1 in the storage apparatus A is utilized as it is.

When the Pool1 in the storage apparatus B is merged with the Pool in the storage apparatus A and when there is the replication pair relationship between the VVol1 utilizing the Pool1 in the storage apparatus B and the VVol1 utilizing the Pool1 in the storage apparatus A but there is no replication pair relationship with the VVol utilizing the Pool2 in the storage apparatus A, the Pool1 in the storage apparatus B is merged with the Pool2 in the storage apparatus A in which there is no replication pair relationship between the VVols.

The Pool merge processing described above prevents segments assigned to the VVols in the replication pair relationship from existing within the same PoolVol in a mixed manner by taking into consideration of the replication pair relationship between the VVols. Thus, it is possible to prevent data loss which occurs since both VVols set in the replication pair relationship becomes inaccessible during PoolVol failures.

A screen 8200 shows an example of a screen displayed when the management program 2400 or the management IF 1020 in the storage apparatus 1000 includes an output device in order to select the Pool merge method taking into consideration the replication pair relationship between the VVols.

The screen 8200 includes a selection part 8210 for specifying a merge destination storage apparatus, a selection part 8220 for selecting a Pool that is a merge target, a merge Pool selection part 8230 for selectively merging only a Pool belonging to a specific storage apparatus, and a merge Policy selection part 8240 for selecting a merge Policy for Pool merge. The Pool merge processing shown in FIG. 31 or 32 can be selected by use of the merge Policy selection part 8240.

Figure 33:
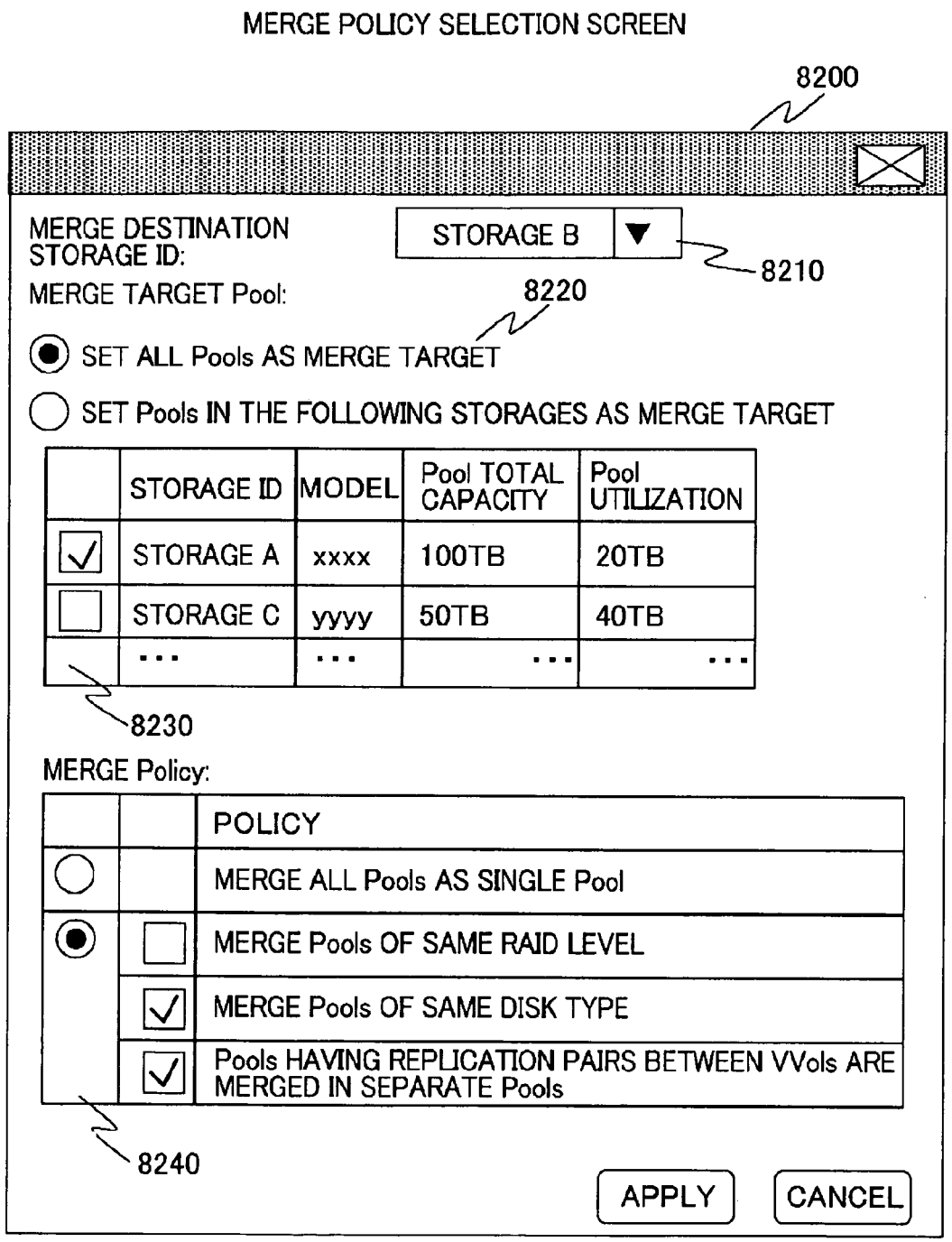
FIG. 33 is a diagram showing an example of a pool merge method selection screen outputted by a management computer of Example 2.

Note that the merge Policy may enable multiple selections and the like, and may also enable merge of multiple attributes or conditions. In the example of FIG. 33, it is possible to select a case of matching the RAID level in terms of ensuring reliability of data storage, a case of matching the disk type in terms of data IO performance and a case of considering the replication pair relationship, in addition to a case of merging all Pools regardless of a specific merge Policy.

The screen 8200 as described above is presented to an administrator or the like of the storage system 1, thereby enabling the administrator or the like to select a suitable Pool merge mode that meets the system operational request.

Example 3

Next, the embodiment of the present invention will be described according to Example 3. In Examples 1 and 2 described above, the method for merging Pools by using the Pool merge processing part 4600 in the storage apparatus (for example, the storage apparatus B) has been disclosed.

In this example, Pool merge is executed by the management program 2400 running in the management computer 2000.

Figure 34:
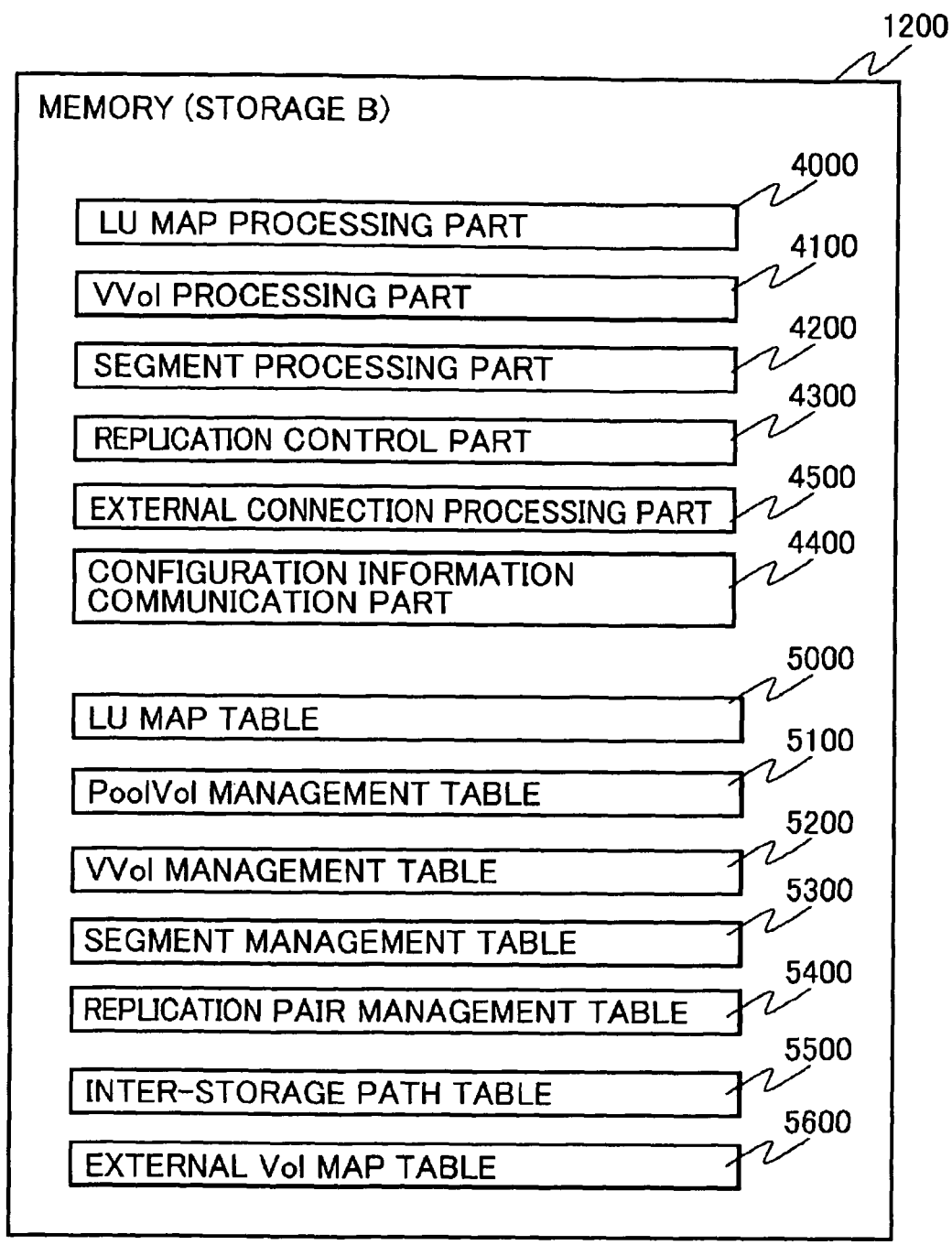
FIG. 34 is a diagram showing an example of processing units and tables in a storage apparatus B (1000) according to Example 3 of the present invention.

An overall block diagram of a storage system 1 of Example 3 is the same as that shown in FIG. 1. However, a configuration of processing parts provided in a memory 1200 in a storage apparatus B (1000) is different. FIG. 34 shows an example of the configuration of the processing parts in the storage apparatus B (1000) according to this example. As shown in FIG. 34, in the storage apparatus B of this example, a configuration information communication part 4400 is provided instead of the Pool merge processing part 4600 in Examples 1 and 2. The configuration information communication part 4400 enables Pool configuration information in the storage apparatus B to be transmitted to the management program 2400 operated in the management computer 2000, and also has the function of issuing a necessary instruction to each of the other processing parts based on the Pool configuration information received from the management program 2400, and of changing the Pool configuration information of its own into a configuration conforming to the Pool configuration information received from the management program 2400.

Figure 35:
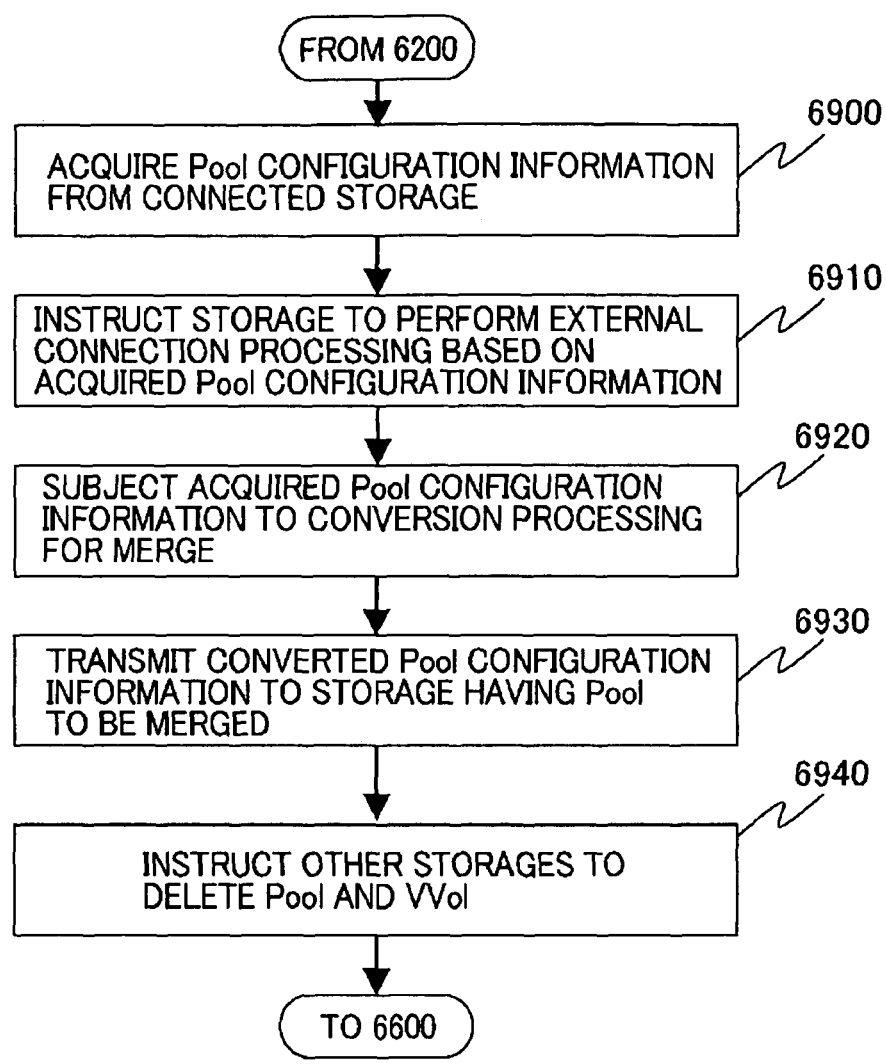
FIG. 35 is a diagram showing an example of a pool merge processing flow by a management program 2400 of Example 3.

FIG. 35 shows an example of a flow of processing performed by the management program 2400 in the management computer 2000. In the processing flow of this example, Step 6900 is executed as processing first following Step 6200 shown in FIG. 18, Step 6200 being the processing of setting the VVol in the storage apparatus 1000 to be offline from the host computer 3000.

In Step 6900, the management program 2400 acquires Pool configuration information from all storage apparatuses 1000 connected to the management computer 2000.

Next, in Step 6910, a PoolVol of a Pool to be a merge target is externally connected to the storage apparatus 1000 to be a merge destination, as in the case of Step 7200, based on the acquired Pool configuration information.

In this event, a screen for selecting a merge target as shown in FIG. 33 may be displayed to encourage the administrator of the storage system 1 to make inputs. Moreover, in the case of displaying no selection screen, a Pool to be merged may be determined based on a merge Policy such that the Pool is merged with a Pool in the storage apparatus 1000 with higher performance, for example, having a largest capacity of cache memory 1300.

Next, in Step 6920, the acquired Pool configuration information is converted in the same manner as that in Step 7300.

In Step 6930, the management program 2400 transmits the rewritten Pool configuration information to the storage apparatus 1000 as the merge destination. The configuration information communication part 4400 in the storage apparatus 1000, which has received the transmitted Pool configuration information, changes the Pool configuration in its own storage apparatus 1000 according to the received configuration information.

In Step 6940, the management program 2400 instructs each of the storage apparatuses 1000 to delete the Pool as the merge target and the VVol. However, during this deletion processing, the management program 2400 does not allow the host computer 3000 to access the data in the PoolVols that form each Pool. Thereafter, the management program 2400 advances to Step 6600 in FIG. 18.

For example, when the Pool in the storage apparatus A is merged with the Pool in the storage apparatus B in the storage apparatuses A and B having the Pool configuration information shown in FIGS. 9 to 14, the management program 2400 acquires the Pool configuration information from each of the storage apparatuses A and B through the management IF 1010 and the like.

The management program 2400 specifies PoolVols forming the Pool in the storage apparatus A based on the Pool configuration information acquired from the storage apparatus A among the acquired Pool configuration information. Then the management program 2400 externally connects the PoolVols by performing the same processing as that of Step 7200 shown in FIG. 19, thereby enabling the PoolVols to be utilized in the storage apparatus B. In this event, the management program 2400 inhibits write of data stored in the PoolVols in the storage apparatus A.

Furthermore, the management program 2400 rewrites a Pool ID, a VVol ID and a segment ID in the Pool configuration information on PoolA among the Pool configuration information acquired from the storage apparatuses A and B in the same manner as Steps 7320 to 7340, and creates Pool configuration information obtained by merging the Pool configuration information in the storage apparatuses A and B.

Thereafter, the created Pool configuration information is transmitted to the storage apparatus B to merge the Pool in the storage apparatus A with the Pool in the storage apparatus B. Thus, the Pools as shown in FIGS. 25 to 27 can be provided in the storage apparatus B.

Note that, also in the case of performing the Pool merge by the management program 2400, the Pool merge processing may be executed by taking into consideration of the replication pair, attributes of the PoolVol, performance of the VVol and the like as described in Examples 1 and 2.

Example 4

Next, Example 4 will be described. In Examples 1 to 3, the method for merging

Pools in a case where there are two or more storage apparatuses 1000 each formed as separate package, and where a Pool in one storage apparatus is merged with a Pool in another storage apparatus 1000 has been disclosed.

In Example 4, a method for integrating two or more Pools provided in the same storage apparatus 1000 into one Pool is disclosed. FIG. 36 schematically shows processing in Example 4.

In a state before execution of merge processing, the storage apparatus 1000 has a Pool1 including LDEV1 and LDEV2 as a PoolVol, a VVol1 utilizing the Pool1, a Pool2 including LDEV3 and LDEV4 as a PoolVol and a VVol2 utilizing the Pool2. The storage apparatus 1000 includes a Pool merge processing part 4600.

In the storage apparatus 1000, the same processing as Steps 7320, 7330, 7340 and 7410 shown in FIG. 22 is performed.

Thus, as a result of the Pool merge, a Pool and VVols can be created which are to be the Pool1 including LDEV1, LDEV2, LDEV3 and LDEV4 as the PoolVol and the VVol1 and VVol2 utilizing the Pool1.

Note that, in addition to the above processing, the method may include steps of performing merge taking into consideration the replication pair relationship between virtual volume VVols as described in Steps 7350 to 7370, and of selecting a Pool to be merging based on attribute information on the PoolVol as described in Example 2.

According to this example, when unevenness occurs between Pool utilizations of two or more Pools in the same storage apparatus 1000, these Pools are integrated into a single Pool. Thus, a waste of storage capacity due to the uneven utilization can be reduced.

The invention claimed is:

1. A storage system, comprising:
a first storage apparatus including a first storage controller that manages a first pool that is a storage area provided by a plurality of physical disks and managed as a set of unit storage areas forming the storage area, and at least one logical volume created from the unit storage areas in the first pool, and
the first storage controller including a first configuration information holding unit having first configuration information holding an association among a pool identifier for identifying the first pool, a volume identifier for identifying the logical volume created from the first pool, and a unit storage area identifier for identifying the unit storage areas forming the logical volume; and
a second storage apparatus communicably connected to the first storage apparatus, and including a second storage controller that manages a second pool having a same configuration as that of the first pool and at least one logical volume created from the unit storage areas in the second pool, and
the second storage controller including a second configuration information holding unit having second configuration information holding an association among a pool identifier for identifying the second pool, a volume identifier for identifying the logical volume created from the second pool, and a unit storage area identifier for identifying the unit storage areas forming the logical volume,
wherein the second storage apparatus includes:
an external connection processing part that specifies the logical volume included in the first pool by acquiring the first configuration information from the first configuration information holding unit in the first storage apparatus, and associates an external volume identifier with the specified logical volume in the first storage apparatus, the external volume identifier being used by the second storage controller to identify and manage the logical volume as an external volume that is a virtual volume in the second storage apparatus, and a pool merge processing part that rewrites the acquired first configuration information so that the pool identifier for identifying the first pool is rewritten to the pool identifier for identifying the second pool, the unit storage area identifier for identifying the unit storage areas in the first pool is rewritten to an identifier that is different than the unit storage area identifier for identifying the unit storage areas in the second pool, and the volume identifier of the logical volume included in the first pool is rewritten into the external volume identifier, and adds contents of the rewritten first configuration information to the second configuration information in order to enable the second storage apparatus to utilize the logical volume created from the first pool, and wherein each of the first storage apparatus and the second storage apparatus includes:

an LU map processing part that manages LU mapping specifying association between an identifier of a logical volume recognized by an external apparatus connected to the first and second storage apparatuses and a volume identifier being an identifier of the logical volume used in the storage apparatus, a VVol processing part that creates a virtual volume provided to the external apparatus and controls a capacity of the virtual volume by assigning a segment that is the unit storage area to the created virtual volume, and a segment processing part that manages an association relationship among a volume identifier of the logical volume forming the pool, the segment assigned to the virtual volume, and the logical volume.

2. The storage system according to claim 1, wherein each of the first storage apparatus and the second storage apparatus includes a replication control part configured to perform processing regarding replication of data by the volume to the logical volume and the virtual volume, and wherein the first storage apparatus further includes a configuration information communication part having a function of transmitting a table storing configuration information in the storage apparatus to the outside in response to a request from the outside, of receiving the table of the configuration information from the outside, and of changing a configuration inside the storage apparatus according to the received table.

3. The storage system according to claim 1, wherein in the case of adding the rewritten first configuration information to the second configuration information, when it is determined that the volume identifier included in the second configuration information overlaps with the volume identifier included in the rewritten first configuration information, the pool merge processing part changes the volume identifier included in the rewritten first configuration information to not overlap with the volume identifier included in the second configuration information.

4. The storage system according to claim 3, wherein the second configuration information further holds an association between the volume identifier and a virtual volume identifier that is an identifier for identifying a virtual volume as a virtual logical volume formed of the unit storage areas forming the second pool, and in the case of rewriting the volume identifier associated with the virtual volume identifier into the external volume identifier in the acquired first configuration information, when the virtual volume identifier included in the first configuration information overlaps with the virtual volume identifier included in the second configuration information, the pool merge processing part changes the virtual volume identifier included in the first configuration information so that the virtual volume identifier does not overlap with the virtual volume identifier included in the second configuration information.

5. The storage system according to claim 3, wherein the first storage apparatus has a third pool different from the first pool, and includes a secondary virtual volume created from the third pool, the secondary virtual volume being a replication destination of data stored in the virtual volume, the first configuration information further holds a replication relationship showing an association between a virtual volume identifier given to the virtual volume and a virtual volume identifier given to the secondary virtual volume, and in the case of adding the first configuration information to the second configuration information, the pool merge processing part refers to the replication relationship, rewrites the pool identifier in the first pool and the pool identifier in the third pool into different identifiers, in order to merge the first pool and the third pool with a different pool in the second storage apparatus, and then adds the rewritten identifiers to the second configuration information.

6. The storage system according to claim 5, wherein in the case of adding the first configuration information to the second configuration information, the pool merge processing part adds information indicating that there is the replication relationship between the pool identifier in the first pool and the pool identifier in the third pool.

7. The storage system according to claim 3, wherein in the case of adding the first configuration information to the second configuration information, the pool merge processing part copies data from the external volume to the logical volume created from the second pool, the data specified by the volume identifier associated with the virtual volume identifier included in the first configuration information through the pool identifier, and rewrites the pool identifier associated with the virtual volume included in the first configuration information and the volume identifier associated with the pool identifier into the pool identifier and the volume identifier in the second pool as a replication destination of the data, so that the second pool provides a storage area of data stored in the virtual volume in the first storage apparatus.

8. The storage system according to claim 1, wherein the first configuration information further holds an association between the volume identifier and a virtual volume identifier for identifying a virtual volume as a virtual logical volume formed of the unit storage areas forming the first pool, and the pool merge processing part rewrites the acquired first configuration information so that the volume identifier associated with the virtual volume identifier is rewritten into the external volume identifier, so as to enable the virtual volume in the first storage apparatus to be utilized in the second storage apparatus.

9. The storage system according to claim 1, wherein the first configuration information further holds attribute information added to the logical volume included in the first pool, and in the case of associating the logical volume forming the first pool as the external volume, the pool merge processing part refers to the first configuration information to add, to the first configuration information, attribute information of the logical volume associated with the external volume.

10. The storage system according to claim 9, wherein
the second configuration information further holds attribute information added to the logical volume included in the second pool, and
in the case of adding the first configuration information to the second configuration information, when it is determined that the attribute information of the logical volume merged in the first pool and the attribute information of the logical volume merged in the second pool are the same, the pool merge processing part rewrites the pool identifier included in the first configuration information into the pool identifier of the second pool.

11. The storage system according to claim 1, wherein
the second storage apparatus includes a management interface for managing data IO from and to an external device, and
the pool merge processing part outputs a user interface enabling selection of a pool to be a target of pool merge through the management interface and the external device, and executes merge processing for the pool, the merge processing being selected by using the user interface through the external device and the management interface.

12. The storage system according to claim 1, wherein
the first pool is included in the second storage apparatus instead of the first storage apparatus, and
the pool merge processing part in the second storage apparatus specifies the logical volume included in the first pool based on the second configuration information and rewrites the second configuration information so that the volume identifier of the logical volume included in the first pool is rewritten into the volume identifier of the logical volume included in the second pool.

13. The storage system according to claim 1, further comprising:
a management computer for managing the first storage apparatus and the second storage apparatus, the management computer being communicably connected to the first storage apparatus and the second storage apparatus,
wherein the management computer acquires the first configuration information from the first storage apparatus, acquires the second configuration information from the second storage apparatus, transmits, to the external volume processing part, a command to associate the logical volume included in the first pool as the external volume based on the acquired first configuration information, adds, to the second configuration information, the first configuration information in which the volume identifier of the logical volume included in the first pool is rewritten into the volume identifier of the external volume associated with the second storage apparatus, and transmits the first configuration information to the second storage apparatus.

14. The storage system according to claim 13, wherein the management computer has an input device and an output device, outputs a user interface enabling selection of the pool to be a merge target through the output device, and receives selection of the pool inputted by using the user interface through the input device.

15. A method for operating a storage system that includes a first storage apparatus and a second storage apparatus,
the first storage apparatus including a first storage controller that manages a first pool that is a storage area provided by a plurality of physical disks and managed as a set of unit storage areas forming the storage area, and at least one logical volume created from the unit storage areas in the first pool,
the first storage controller including a first configuration information holding unit having first configuration information holding an association among a pool identifier that is an identifier for identifying the first pool, a volume identifier that is an identifier for identifying the logical volume created from the first pool, and a unit storage area identifier that is an identifier for identifying the unit storage areas forming the logical volume,
the second storage apparatus communicably connected to the first storage apparatus, and including a second storage controller that manages a second pool having a same configuration as that of the first pool and at least one logical volume created from the unit storage areas in the second pool,
the second storage controller including a second configuration information holding unit having second configuration information holding an association among a pool identifier that is an identifier for identifying the second pool, a volume identifier that is an identifier for identifying the logical volume created from the second pool, and a unit storage area identifier that is an identifier for identifying the unit storage areas forming the logical volume,
each of the first storage apparatus and the second storage apparatus including:
an LU map processing part that manages LU mapping specifying association between an identifier of a logical volume recognized by an external apparatus connected to the first and second storage apparatuses and a volume identifier being an identifier of the logical volume used in the storage apparatus,
a VVol processing part that creates a virtual volume provided to the external apparatus and controls a capacity of the virtual volume by assigning a segment that is the unit storage area to the created virtual volume, and
a segment processing part that manages an association relationship among a volume identifier of the logical volume forming the pool, the segment assigned to the virtual volume, and the logical volume,
the method being performed by a pool merge processing part provided in the second storage apparatus, the method comprising:
specifying the logical volume included in the first pool by acquiring the first configuration information from the first configuration information holding unit;
associating an external volume identifier with the specified logical volume in the first storage apparatus, the external volume identifier being used by the second storage controller to identify and manage the logical volume as an external volume that is a virtual volume in the second storage apparatus; and
rewriting the acquired first configuration information so that the pool identifier for identifying the first pool is rewritten to the pool identifier for identifying the second pool, the unit storage area identifier for identifying the unit storage areas in the first pool is rewritten to an identifier that is different than the unit storage area identifier for identifying the unit storage areas in the second pool and the volume identifier of the logical volume included in the first pool is rewritten into the external volume identifier, and
adding contents of the rewritten first configuration information to the second configuration information in order to enable the second storage apparatus to utilize the logical volume created from the first pool.

* * * * *

UNITED STATES PATENT AND TRADEMARK OFFICE
CERTIFICATE OF CORRECTION

| | | |
|---|---|---|
| PATENT NO. | : 8,572,346 B2 | Page 1 of 1 |
| APPLICATION NO. | : 12/310728 | |
| DATED | : October 29, 2013 | |
| INVENTOR(S) | : Naganuma et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this
Twenty-first Day of July, 2015

Michelle K. Lee
*Director of the United States Patent and Trademark Office*